United States Patent
Avallone et al.

(10) Patent No.: US 7,254,326 B2
(45) Date of Patent: *Aug. 7, 2007

(54) OPTICAL TRANSMISSION SYSTEM WITH RAMAN AMPLIFIERS COMPRISING A SUPERVISORY SYSTEM

(75) Inventors: Roberto Avallone, Milan (IT); Andrea Fregosi, Milan (IT)

(73) Assignee: Alcatel, Paris (FR)

( * ) Notice: Subject to any disclaimer, the term of this patent is extended or adjusted under 35 U.S.C. 154(b) by 111 days.

This patent is subject to a terminal disclaimer.

(21) Appl. No.: 10/500,036

(22) PCT Filed: Dec. 27, 2001

(86) PCT No.: PCT/EP01/15330

§ 371 (c)(1),
(2), (4) Date: Feb. 1, 2005

(87) PCT Pub. No.: WO03/069811

PCT Pub. Date: Aug. 21, 2003

(65) Prior Publication Data

US 2005/0117839 A1  Jun. 2, 2005

(51) Int. Cl.
*H04B 10/08* (2006.01)
*H04B 17/00* (2006.01)

(52) U.S. Cl. .......................... 398/30; 398/31
(58) Field of Classification Search ............. 398/30–31
See application file for complete search history.

(56) References Cited

U.S. PATENT DOCUMENTS

| | | | |
|---|---|---|---|
| 5,625,481 A | 4/1997 | Tamura et al. | |
| 6,111,687 A | 8/2000 | Tammela | |
| 6,188,508 B1 | 2/2001 | Horiuchi et al. | |
| 6,452,721 B2 * | 9/2002 | Deguchi et al. | 359/341.33 |
| 6,714,739 B1 * | 3/2004 | Kandpal et al. | 398/31 |
| 6,839,162 B2 * | 1/2005 | Sekiya et al. | 359/337.4 |
| 6,839,523 B1 * | 1/2005 | Roberts | 398/177 |
| 6,930,823 B2 * | 8/2005 | Nakamoto et al. | 359/334 |
| 2001/0003486 A1 | 6/2001 | Mikami | |

(Continued)

FOREIGN PATENT DOCUMENTS

DE   100 10 237 A1   9/2001

(Continued)

OTHER PUBLICATIONS

Agrawal, G. P., "Nonlinear Fiber Optics", Academic Press, Second Edition, The Institute of Optics University of Rochester, Rochester, New York, pp. 317-319, (1995).

(Continued)

*Primary Examiner*—Deandra M. Hughes
(74) *Attorney, Agent, or Firm*—Sughrue Mion, PLLC

(57) ABSTRACT

An optical transmission system having a supervisory system of devices disposed along an optical link. Co-propagating Raman amplifiers are disposed along the optical link. Low frequency supervisory signals are superimposed on the optical signals traveling on the optical link by suitable modulators in the devices disposed along the line or by the same co-propagating Raman amplifiers. Regeneration of the supervisory signal is provided in at least one device disposed along the optical link in order to counteract attenuation introduced on the supervisory signal by the co-propagating Raman amplifiers.

36 Claims, 16 Drawing Sheets

U.S. PATENT DOCUMENTS

2005/0089325 A1* 4/2005 Shan .......................... 398/30
2005/0117839 A1* 6/2005 Avallone et al. .............. 385/24

FOREIGN PATENT DOCUMENTS

| EP | 0 504 777 B1 | 9/1992 |
| EP | 0 669 730 A2 | 8/1995 |
| EP | 0 675 610 A1 | 10/1995 |
| EP | 0 751 635 A2 | 1/1997 |
| EP | 0 917 313 A2 | 5/1999 |
| EP | 1 122 898 A1 | 8/2001 |
| GB | 2 314 224 A | 12/1997 |

OTHER PUBLICATIONS

Maeda, H. et al., "Remote Supervisory System of FSA-WDM System", NTT Reviews, vol. 12, No. 4, pp. 25-31, (Jul. 2000).

* cited by examiner

OPTICAL TRANSMISSION SYSTEM WITH RAMAN AMPLIFIERS COMPRISING A SUPERVISORY SYSTEM

CROSS REFERENCE TO RELATED APPLICATIONS

This application is a national phase application based on PCT/EP01/15330, filed Dec. 27, 2001, the content of which is incorporated herein by reference.

BACKGROUND OF THE INVENTION

1. Field of the Invention

The present invention relates an optical transmission system with Raman amplifiers comprising a supervisory system. The present invention also relates to an optical repeater.

2. Description of the Related Art

In an optical transmission system, especially in a submarine optical transmission system, there is the very felt need of supervising the operating state of devices disposed along the optical line, such as for example optical repeaters, branching units and so on. In the particular case of a submarine system, such supervising has to be performed remotely.

In the present description and claims, the expression "supervisory signal" is used to indicate either command informations suitable to set predetermined system parameters (such as, for example, the gain and the output power of an optical amplifier), or query informations suitable to check the operating state of a device, or informations on the operating state of said device, or communications between the maintenance and/or supervisory personnel operating in intermediate points of the optical line or in terminal stations of the system.

For example, the supervising of the operating state of an optical repeater typically comprises control functions, such as for example the regulation of the value of the current furnished to the pump lasers, or the switching between a working pump laser and a spare pump laser, and so on. Further, the supervising of the operating state of an optical repeater typically also comprises monitor functions, such as for example the monitoring of the operating temperature of the repeater, or the monitoring of the current furnished to the pump lasers, or the monitoring of the input power of the optical signal entering into the repeater and/or the monitoring of the output power of the optical signal exiting from the repeater, and so on.

For the purpose of supervising, many kinds of supervisory systems in optical transmission systems have been proposed.

For example, EP0504777 discloses a transmission system for transmitting over an optical link an auxiliary signal that is auxiliary relative to a traffic signal which is transmitted simultaneously over said link, the system including at least one equipment including optical amplification means. For the purpose of enabling said equipment to emit the auxiliary signal, the system includes means for modulating the gain of the optical amplification means of said equipment by said auxiliary signal. Optical amplification means disclosed in '777 patent are rare-earth doped fiber amplifiers and semiconductor amplifiers.

EP0675610 teaches to modulate the pump radiation of an erbium doped fiber amplifier through a modulating signal carrying supervisory informations. Such modulating signal has a high modulation frequency, that is, a modulation period that is less than the fluorescence time of erbium ions, so as not to affect the gain of the erbium doped fiber amplifier. In this way, the supervisory informations are sent using as optical carrier the excess pump radiation that does not contribute to the erbium doped fiber amplifier pumping.

U.S. Pat. No. 5,625,481 teaches to modulate the spontaneous emission of an erbium-doped optical fiber amplifier with a supervisory signal through a band pass optical filter whose transmission characteristic is changed in function of the supervisory signal.

U.S. Pat. No. 6,111,687 teaches to use a band pass optical filter for modulating an optical signal in output from an optical amplifier with such amplitude and frequency as to not disturb the data transmission performed by the optical signal. Such modulation allows the optical amplifier to transmit supervisory messages.

EP0751635 describes a supervisory system for a WDM optical communication system for transmitting a command signal from a terminal station to an erbium-doped optical fibre amplifier and response signals from an erbium-doped optical fibre amplifier to the terminal station. A first method described for transmitting the command signal consists in using the same command signal to directly modulate, one by one, a plurality of optical sources that generate laser beams at different wavelengths. The laser beams at different wavelengths are then externally modulated by the respective main signals to be transmitted along the system and thus, wavelength multiplexed. According to a second method, the laser beams at different wavelengths are first externally modulated by the respective main signals, then they are wavelength multiplexed in a single WDM optical signal; afterwards, the latter is externally modulated in function of the command signal through a lithium niobate modulator (LiNbO3). On the other hand, as regards the response signals sent by the erbium-doped optical amplifiers to the terminal stations, they are transmitted by directly modulating the pump source of the optical amplifiers in function of the response signal to be transmitted so as to modulate the gain of the erbium-doped optical amplifiers. The command signals have a frequency in the range of 10 MHz whereas response signals have a frequency in the range of KHz.

Fiber Raman amplifiers have been attracting a great attention, because of their capability to increase the transmission capacity and/or repeaterless span lengths. Raman amplification is an amplification by which energy is transferred from an electromagnetic pump wave to a lower frequency signal wave via a molecular vibration. The responsible mechanism is stimulated Raman scattering (SRS).

Raman amplifiers offer several advantages, such as a low noise, a greater flexibility in choosing the signal wavelength and a broad gain bandwidth. The greater flexibility in choosing the signal wavelength mainly depends on the fact that the Raman peak of a material, exploited for the amplification of the signal, is dependent practically only on the pump wavelength, differently from what happens for example in erbium-doped fiber amplifiers, in which the choice of the signal wavelength is restricted by the stimulated emission cross-section of the erbium. The broad gain bandwidth of Raman amplifiers can be much enlarged, for example by using multiple pump sources. Such a broad gain bandwidth may represent the possibility to extend the usable optical bandwidth outside the conventional C-band and the extended L-band of the erbium-doped fiber amplifiers.

The Applicant has faced the problem of implementing a supervisory system in an optical system comprising Raman amplifiers.

It is known that the gain of a Raman amplifier may be modulated according to a supervisory signal to be sent on optical link.

For example, U.S. Pat. No. 6,188,508 discloses a control signal superimposer for superimposing a control signal on a signal light, comprising: a pumping light source for generating a pumping light with intensity fluctuation in accordance with the control signal; a Raman amplification medium pumped by the pumping light from the pumping light source for Raman-amplifying the signal light; a combiner for combining the pumping light output from the pumping light source and the signal light to be Raman-amplified and then supplying them to the Raman amplification medium; and an optical filter for extracting the signal light component from the output light of the Raman amplification medium and terminating the pumping light component. In the '508 patent it is disclosed that in order to superimpose the control signal on the 1.5 µm band signal light through the Raman amplification, it is necessary to propagate the 1.5 µm band signal light desired to be amplified and the pumping light in the same direction.

A control signal superimposer of the kind disclosed in '508 patent is disclosed also in the article of H. Maeda et al., "Remote Supervisory System of FSA-WDM System", NTT Review, vol. 12, n.4 (2000), pages 25-31. A control command corresponding to a repeater supervision item is issued. The terminal equipment converts the received command to a supervisory signal of low-speed subcarrier and superimposes the supervisory signal on the WDM signal for transmission along a transmission line with repeaters. A repeater sends the response signal to the terminal equipment at both ends of the transmission line, or performs repeater state control. Raman amplification is exploited for supervisory signal transmission from the terminal equipment. The configuration of the supervisory signal modulator uses dispersion shifted fiber (DSF) for Raman amplification. A subcarrier-ASK signal is used to intensity-modulate the 1.48 µm pumping source. The resulting signal co-propagates along the DSF with the WDM signal and Raman-amplifies the WDM signal according to the subcarrier-ASK signal. This WDM signal is then sent to the submarine transmission line. A repeater response signal from the submarine optical repeater is superimposed on the amplified spontaneous emission (ASE) light produced by the repeaters when the system has failed or is out-of-service.

EP1122898 discloses an optical repeater monitoring system comprising an oscillating source, a reference signal transmitter for transmitting a reference signal of a predetermined frequency generated by an output of the oscillating source to a first optical fiber, and an optical repeater. The optical repeater has a first photodetector for converting light from the first optical fiber into an electrical signal, a reference signal extractor for extracting a component of the reference signal from an output of the first photodetector, a carrier generator for generating a carrier from an output of the reference signal extractor, a monitor signal modulator for modulating the carrier generated by the carrier generator with a monitor signal showing an operating state of the optical repeater, a transmitter for transmitting an output of the monitor signal modulator to a second optical fiber. Optical amplifiers (e.g. optical amplifiers using erbium-doped optical fiber), comprised in the optical repeater, are pumped by a pumping circuit and then optically amplify signal lights from the first and the second optical fiber. The output of the monitor signal modulator is applied to the pumping circuit. The pumping circuit weakly modulates the intensity of the pumping light to be transmitted to the optical amplifiers according to the output from the monitor signal modulator. The gain of the optical amplifiers is thus modulated by the output of the monitor signal modulator in order to transmit the monitor signal to a terminal station. In the '898 patent application, it is disclosed that such technique is also applicable to Raman amplification: in such case, pumping light for leading the Raman amplification within the wavelength band of the signal light is applied to the optical fiber line and the intensity of the pumping light is modulated with the output of the monitor signal modulator. As a result, the gain of the signal light propagating on the optical fiber line fluctuates according to the output of the monitor signal modulator and thus brings the same effect with the case in which the gain of the optical amplifiers is fluctuated.

However, the Applicant has found that a signal light modulated with a low frequency subcarrier entering in a Raman amplifier behaves in different manners if the pump radiation co-propagates with the signal light (that is, propagates in the same direction of the signal light) or counter-propagates with respect to the signal light (that is, propagates in the opposite direction with respect to the signal light). In fact, if the signal light and the pump radiation counter-propagate in the Raman amplifying medium, the low frequency subcarrier superimposed to the signal light is substantially left unchanged if the low frequency subcarrier lays in a band of frequencies higher than some kHz, that is, in a typical band of frequencies for a supervisory signal. On the other hand, if the signal light and the pump radiation co-propagate in the Raman amplifying medium, the low frequency subcarrier superimposed to the signal light may be attenuated in a substantial manner. This may cause the loss of the supervisory signal at the end of a chain of co-propagating Raman amplifiers. Herein and in the following, by "co-propagating Raman amplifier" it is to be intended an amplifier in which the pump radiation and the light to be amplified propagate in the Raman medium (e.g. an optical fiber) in the same direction; by "counter-propagating Raman amplifier" it is to be intended an amplifier in which the pump radiation and the light to be amplified propagate in the Raman medium in opposite directions.

As disclosed in the U.S. Pat. No. 6,188,508 cited above, a low frequency modulation of the pump source providing the pumping radiation of a Raman amplifier superimposes such frequency modulation to a signal light amplified in the Raman amplifier if the pump radiation and the signal light co-propagate in the Raman medium. On the other hand, the Applicant has verified that if the pump radiation and the signal light counter-propagate in the Raman medium, no superposition of the low frequency modulation on the signal light practically occurs at frequencies of the order of one kHz and above. In such conditions, a supervisory signal carrying a sufficient quantity of informations could hardly be superimposed to a signal light by modulation of the gain of a counter-propagating Raman amplifier.

Summarizing what said above, the Applicant has found that in an optical transmission system comprising a chain of Raman amplifiers, the following problems may arise, for the implementation of a supervisory system in the optical transmission system:

a) if the Raman amplifiers are co-propagating, each of them could be gain-modulated in order to superimpose a supervisory signal to a signal light propagating through the chain. However, each Raman amplifier would substantially attenuate a supervisory signal superimposed on the signal light by a previous Raman amplifier of the chain or Raman amplifiers or by a terminal station, so that such supervisory signal may be lost at the end of the chain of Raman amplifiers;

b) if the Raman amplifiers are counter-propagating, a supervisory signal superimposed to a propagating signal light may pass through the chain of Raman amplifiers with substantially no attenuation. However, the counter-propagating Raman amplifiers may hardly be gain-modulated in order to provide such supervisory signals by superposition on the signal light.

SUMMARY OF THE INVENTION

The Applicant has found that such problems may be solved by implementing a supervisory system in which:

a) the Raman amplifiers disposed along the optical line are co-progagating, so that they may be used for amplification of the signal light and preferably for the superposition of a supervisory signal on signal light; and b) a regeneration of the supervisory signal is provided in at least one repeater of the chain of Raman repeaters (or in another device disposed along the line).

In a first aspect thereof, the invention relates an optical transmission system comprising at least a first and a second terminal station, optically connected with each other by an optical link, said first or said second terminal station being adapted to send on said optical link at least a first optical signal having a first direction, said system further comprising:

at least a first pump source disposed along said optical link, said pump source being adapted to send on said optical link a pump radiation in said first direction, so as to cause Raman amplification of said first optical signal;

at least one device disposed along said optical link;

characterized in that said device comprises:

at least a first photodetector adapted for converting a portion of said first optical signal in an electrical signal, a first supervisory unit adapted for amplifying said electrical signal, for extracting a first supervisory signal from said electrical signal, and for feeding said extracted amplified first supervisory signal to at least a first modulator connected to said optical link or to a driving circuit of said pump source, so as to superimpose said extracted amplified first supervisory signal on said first optical signal.

In a second aspect thereof, the invention relates an optical repeater comprising at least a first optical fiber adapted to carry a first optical signal in a first direction, at least a first pump source connected to said first optical fiber, said first pump source being adapted to send on said first optical fiber a pump radiation in said first direction, so as to cause Raman amplification of said first optical signal; characterized in that it further comprises:

at least a first photodetector adapted for converting a portion of said first optical signal in an electrical signal, a first supervisory unit adapted for amplifying said electrical signal, for extracting a first supervisory signal from said electrical signal, and for feeding said extracted amplified first supervisory signal to at least a first modulator connected to said first optical fiber or to a driving circuit of said first pump source, so as to superimpose said extracted amplified first supervisory signal on said first optical signal.

In a third aspect thereof, the invention relates a method for supervising an optical transmission system comprising an optical link between at least a first and a second terminal station, said method comprising:

transmitting a first optical signal on said optical link in a first direction;

sending on said optical link a pump radiation in said first direction, so as to cause Raman amplification of said first optical signal;

characterized in that said method further comprises:

converting, in a point along said optical link, a portion of said first optical signal in an electrical signal, amplifying said electrical signal extracting a supervisory signal from said electrical signal; and superimposing said extracted amplified supervisory signal on said first optical signal.

BRIEF DESCRIPTION OF THE DRAWINGS

Further features and advantages of the present invention will be better illustrated by the following detailed description, herein given with reference to the enclosed drawings, in which.

DETAILED DESCRIPTION OF THE INVENTION

The Applicant has performed a series of experiments in order to understand:
a) how a Raman amplifier may allow the passage-through of a low-frequency supervisory signal superimposed on an optical signal;
b) how a Raman amplifier may generate a low-frequency supervisory signal by modulation of its gain.

Experiments for both points a) and b) have been carried out both with co-propagating and counter-propagating configurations of Raman amplifiers.

Experiment 1

Figure 5:
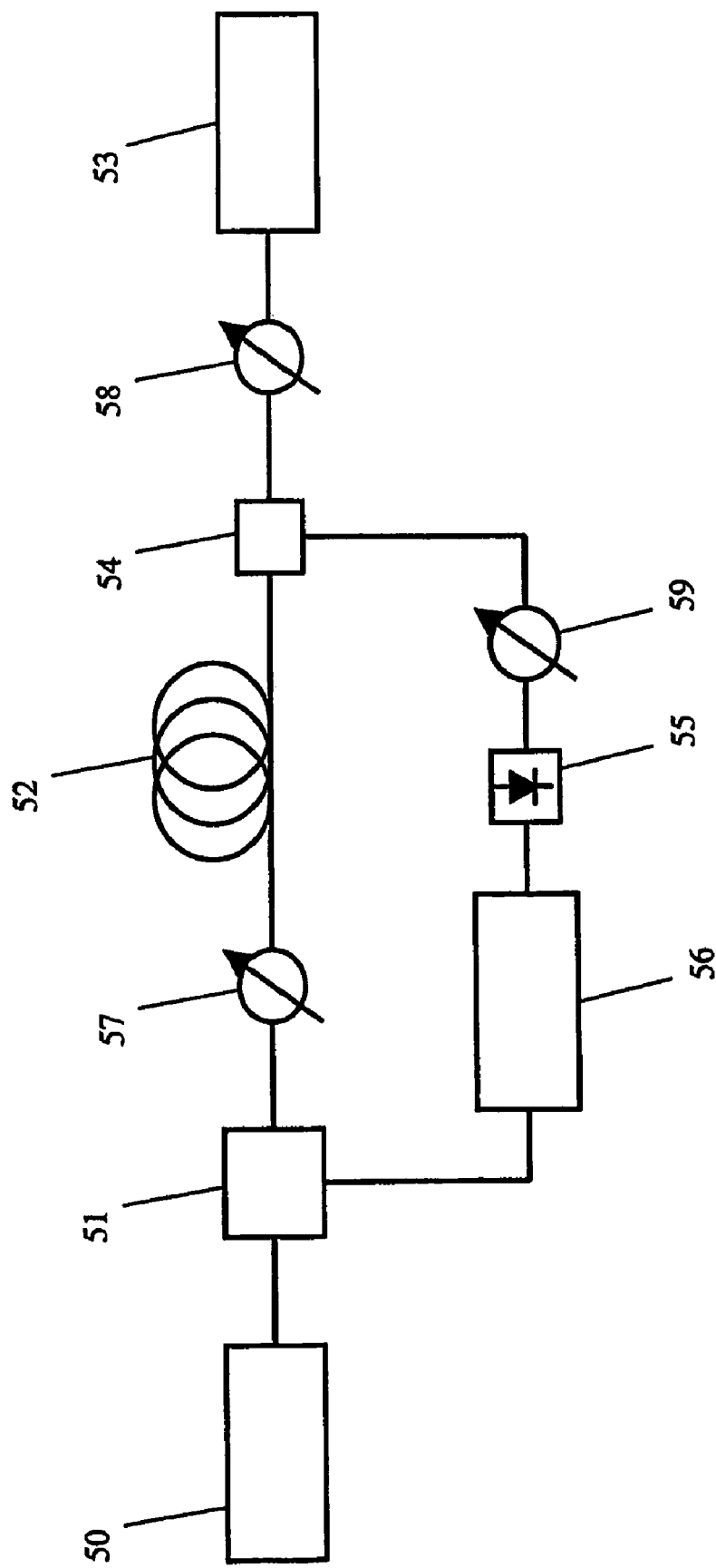
FIG. 5 schematically shows a first experimental setup used by the Applicant for evaluating how efficiently a counter-propagating Raman amplifier may allow the passage of a low-frequency supervisory signal superimposed on an optical signal.

FIG. 5 shows the experimental setup used for point a) with a counter-propagating configuration of Raman amplifier. A wide bandwidth laser source 50 (about 30 nm) emitting an optical continuous wave signal around 1550 nm was connected to a low-frequency modulator 51 and then to 55 km of a standard single mode (SM) optical fiber 52, used as Raman medium. The wide bandwidth laser source 50 was used in order to simulate a WDM signal comprising different wavelength channels. Low-frequency modulator 51 was a magneto-optical attenuator of the YS-500 type, produced by FDK Corporation. A laser source 53 was provided for emitting a pump radiation having a wavelength of 1450 nm and coupled to the optical fiber 52, through a WDM coupler 54, on the opposite side with respect to the wide bandwidth laser source 50. A photodiode 55 was coupled to a second end of the WDM coupler 54. A network analyzer 56 was connected to the low-frequency modulator 51 and to the photodiode 55. Variable attenuators 57, 58, 59 were provided for regulating the optical power entering into the Raman medium 52 and into the photodiode 55. The network analyzer 56 applied to the low-frequency modulator 51 signals having frequencies comprised between 100 Hz and 1 MHz and evaluated the response at the photodiode. The measure was conducted by previously measuring the response with the pump source switched off, in order to calibrate the network analyzer 56, and then by switching on the pump source. The network analyzer thus gave the difference between the response with the pump source switched on and the response with pump source switched off, that is the attenuation on the low-frequency signal introduced by the Raman amplification. In order to avoid any non-linear behavior of the photodiode 55 when the pump was switched off and when the pump was switched on, the attenuator 59 was regulated so that in both cases the same power was fed to the photodiode 55.

Figure 6:
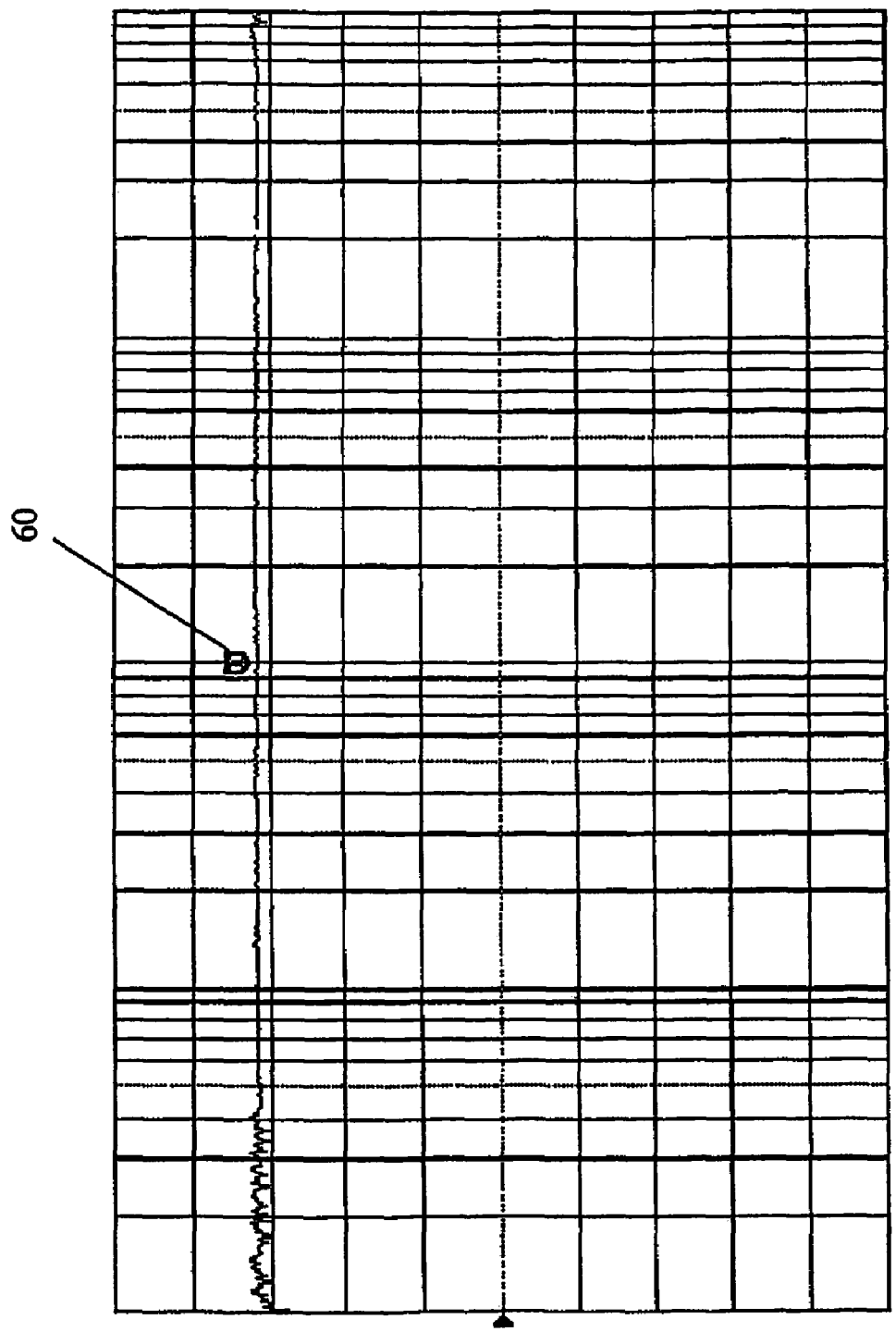
FIGS. 6 and 7 show the results of two measures made with the experimental setup of FIG. 5.

The measure was first carried out with an input power of the signal of +5 dBm, roughly corresponding to the optical power of 10 WDM channels having a power-per-channel of −5 dBm. The pump power was regulated in order to obtain a Raman gain of 6.15 dB. Substantially no attenuation for the low-frequency signal was observed in the whole range of frequencies between 100 Hz and 1 Mhz. FIG. 6 shows the result visualized by the network analyzer. In the x-axis the frequency range between 100 Hz and 1 MHz is shown. In the y-axis the attenuation on the low-frequency signal is shown. Each division in the y-axis corresponds to an attenuation of 2 dB. Marker 60 is positioned at 10 kHz and highlights a value of 0.0075 dB.

Figure 7:
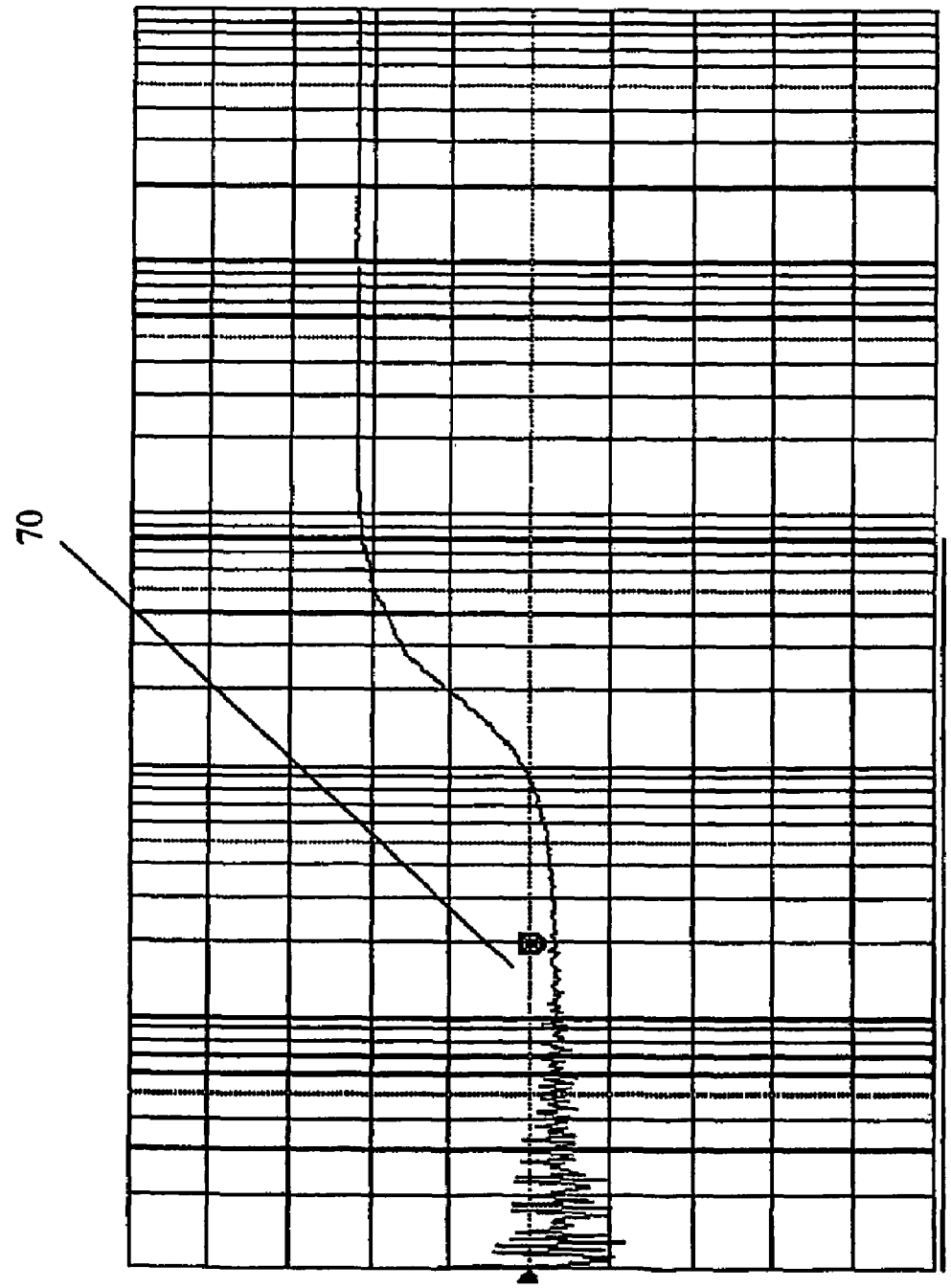

The measure was then carried out with an input power of +15 dBm, roughly corresponding to the optical power of 100 WDM channels having a power-per-channel of −5 dBm. The pump power was regulated in order to obtain a Raman gain of 5.94 dB. Even in this case no substantial attenuation was observed for the low-frequency signal at frequencies higher than about 1 kHz. For frequencies lower than about 1 kHz, an attenuation of about 0.5 dB was observed. The Applicant has verified that such attenuation becomes higher with the growing of the gain. In another measurement, made with 40 km of SM fiber and a more powerful pump source in a setup according to FIG. 5, an input power of 17.95 dBm was launched in the SM fiber, together with a counter-propagating pump power regulated for obtaining a Raman gain of 11 dB. FIG. 7 shows the result visualized by the network analyzer (in this case the x-axis ranges from 10 Hz to 1 MHz). A high-pass behavior of the counter-propagating Raman amplifier is well visible. At frequencies higher than about 10 kHz the attenuation is substantially negligible. At frequencies below 1 kHz (e.g. at the position of the marker 70 at about 200 Hz) the attenuation is about 5 dB, so that the low-frequency signal can be lost. However, it has to be noticed that a threshold frequency of 5-10 kHz is definitely acceptable for a supervisory signal. The oscillations in the lower frequency band visible in FIG. 7 are due to measure errors caused by the network analyzer.

In conclusion, this first series of measures shows that a counter-propagating Raman amplifier does not introduce a significant amount of attenuation on a low-frequency signal superimposed on an optical signal at typical frequencies of supervisory signals. With high input power and high gains, the Raman amplifier has a high-pass behavior: however, the threshold frequency is sufficiently low to allow the implementation of a supervisory system.

Experiment 2

Figure 8:
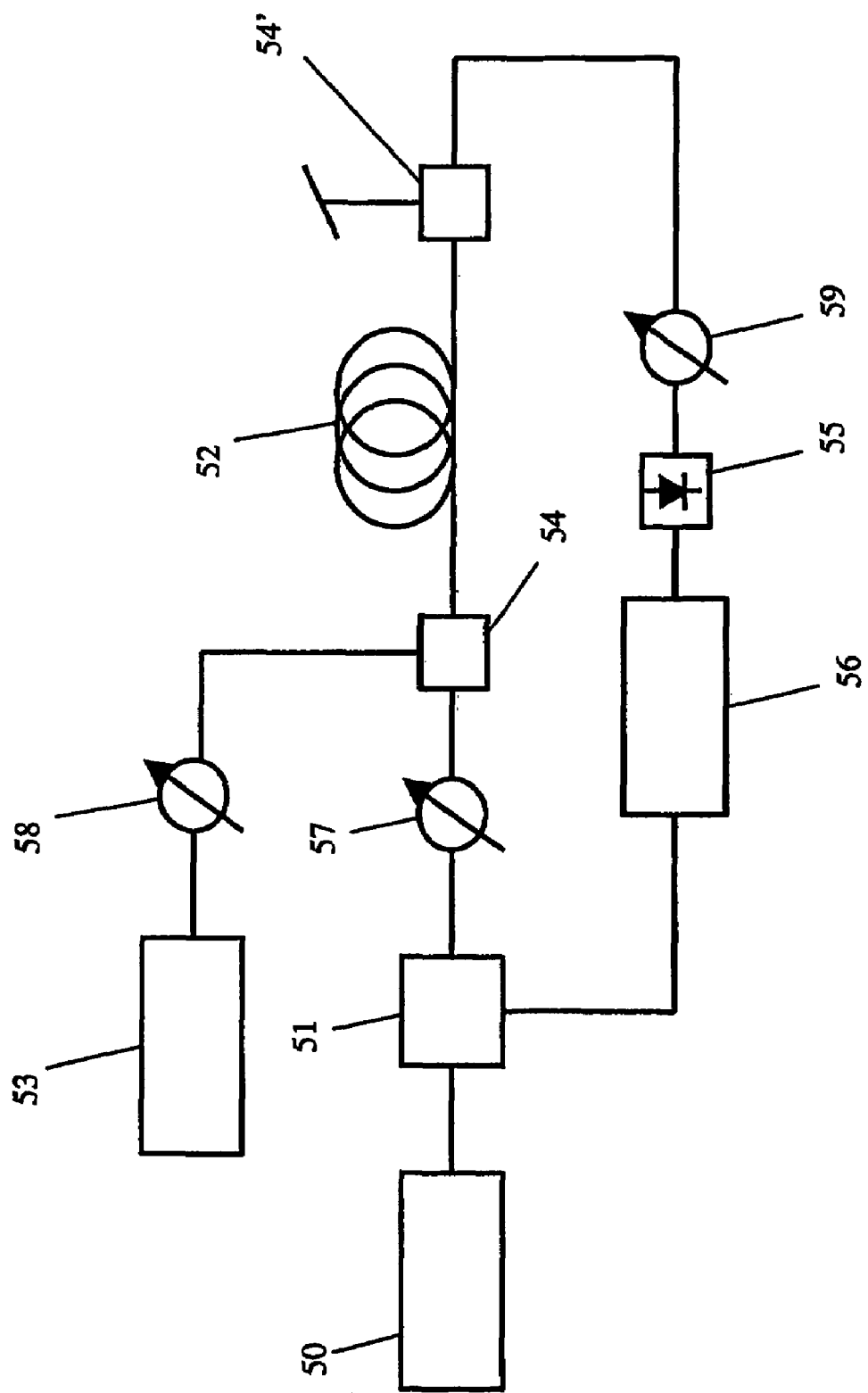
FIG. 8 schematically shows a second experimental setup used by the Applicant for evaluating how efficiently a co-propagating Raman amplifier may allow the passage of a low-frequency supervisory signal superimposed on an optical signal.

FIG. 8 shows the experimental setup used for point a) with a co-propagating configuration of Raman amplifier. The same reference numbers of FIG. 5 are used for corresponding elements. A further WDM coupler 54' was added in order to extract and terminate with a connector having low back-reflection the residual pump power radiation at the output of the fiber 52.

The following table 1 shows the results obtained in different measures made with different lengths of Raman fiber, different input powers of the optical signal and different Raman gains.

TABLE 1

| Fiber length (km) | Input power (dBm) | Raman gain (dB) | Attenuation at 10 kHz (dB) |
|---|---|---|---|
| 55 | +15 | 6.4 | 1.74 |
| 105 | +5 | 8.47 | 3.49 |
| 105 | +10 | 7.24 | 1.77 |
| 105 | +15 | 6.41 | 1.8 |

Figure 9:
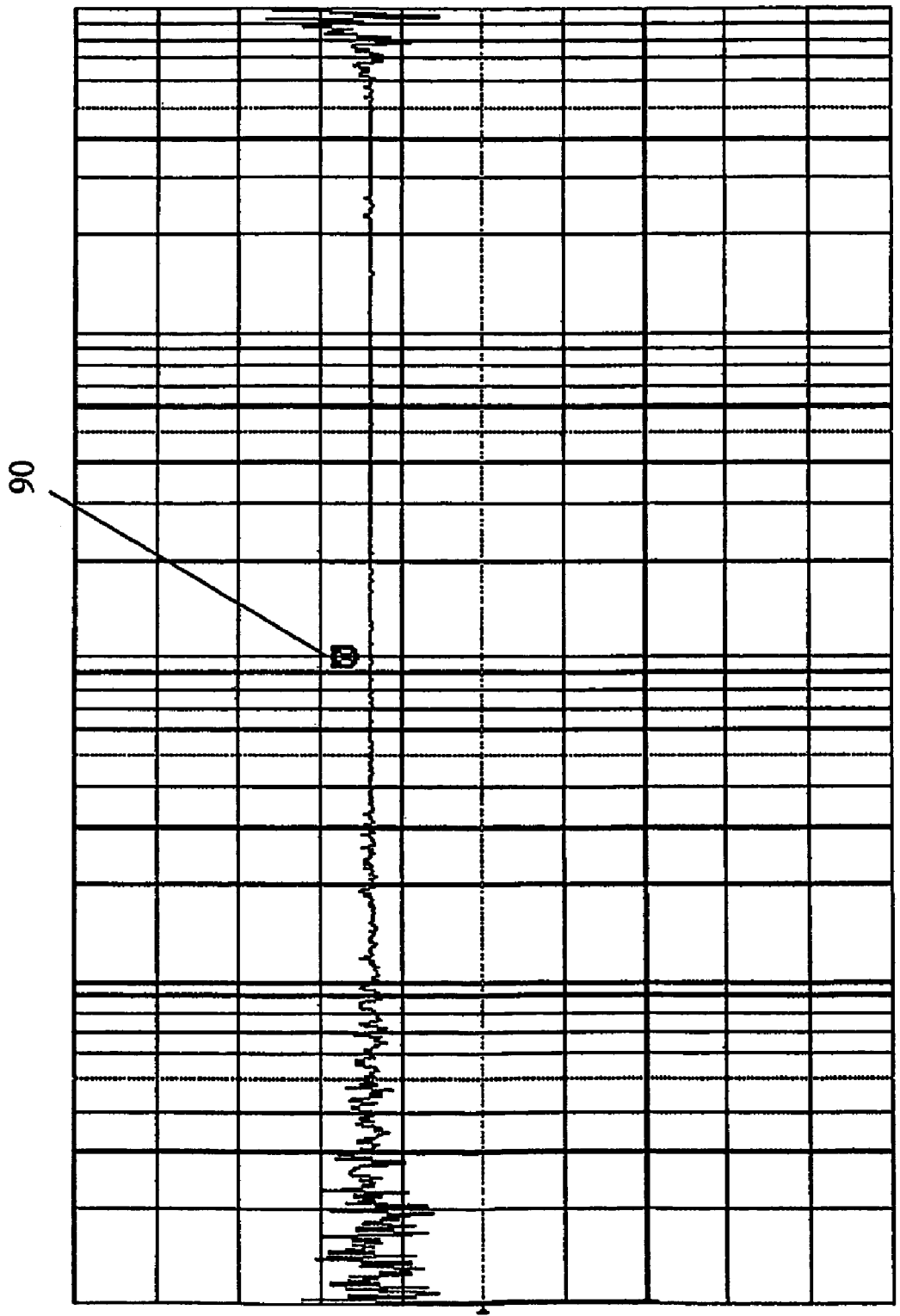
FIG. 9 shows the result of one measure made with the experimental setup of FIG. 8.

As it can be seen, an attenuation of more than 1.7 dB is introduced on the low-frequency signal in all cases. Further, the higher the gain, the higher the attenuation. FIG. 9 shows the result visualized by the network analyzer in the worst case (second row in table 1): the frequency range is from 100 Hz to 1 MHz. As it can be seen, almost the same attenuation is introduced in the whole range of frequencies. The marker 90, positioned at 10 kHz, highlights the attenuation value of 3.49 dB reported in table 1.

In conclusion, the second series of measures shows that a co-propagating Raman amplifier introduces a significant amount of attenuation on a low-frequency signal superimposed on an optical signal at typical frequencies for supervisory signals. This may cause the loss of the supervisory signal in a chain of co-propagating Raman amplifiers comprising even few amplifiers.

Experiment 3

Figure 10:
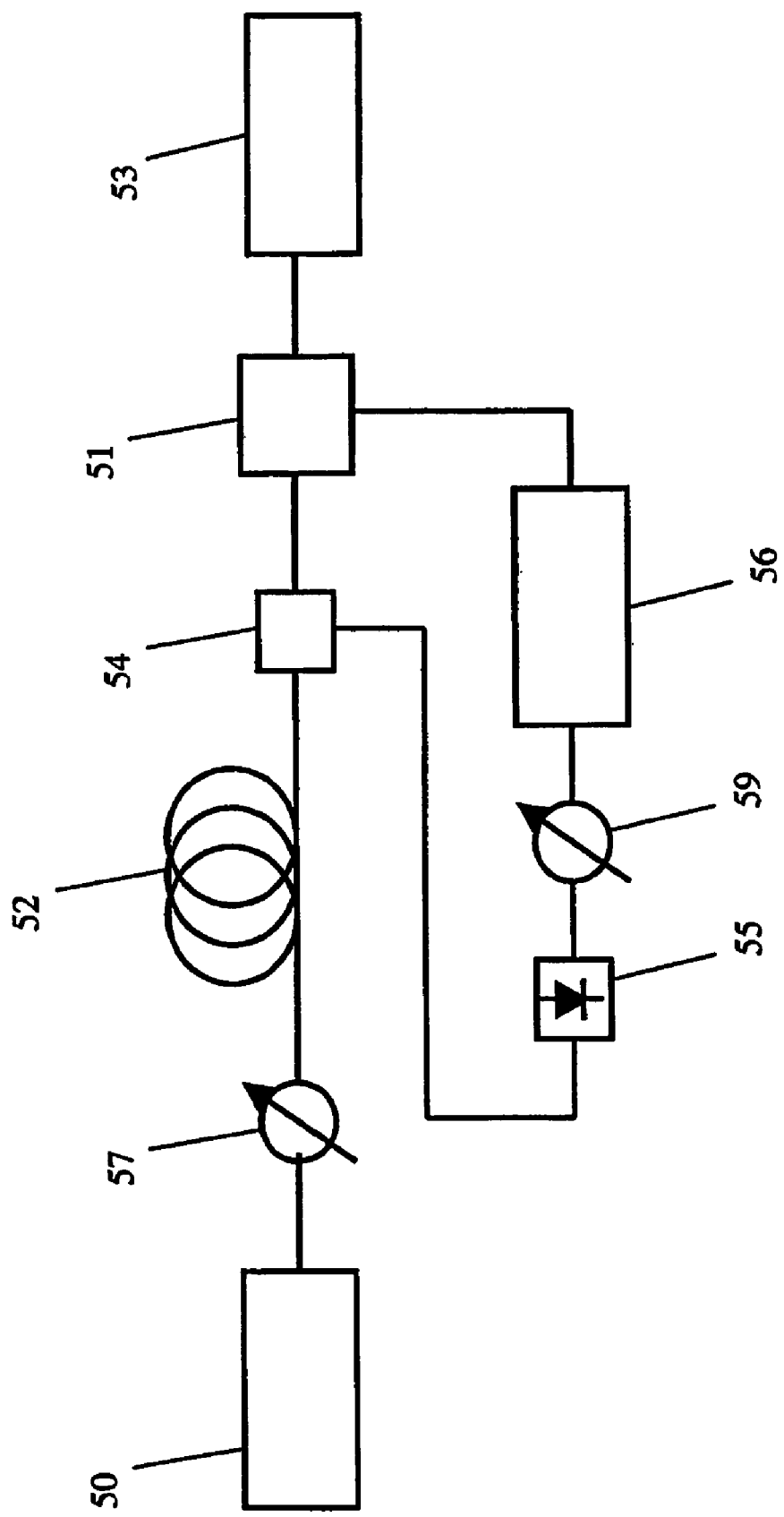
FIG. 10 schematically shows a third experimental setup used by the Applicant for evaluating how efficiently a counter-propagating Raman amplifier may generate a low-frequency supervisory signal by modulation of its gain.
Figure 11:
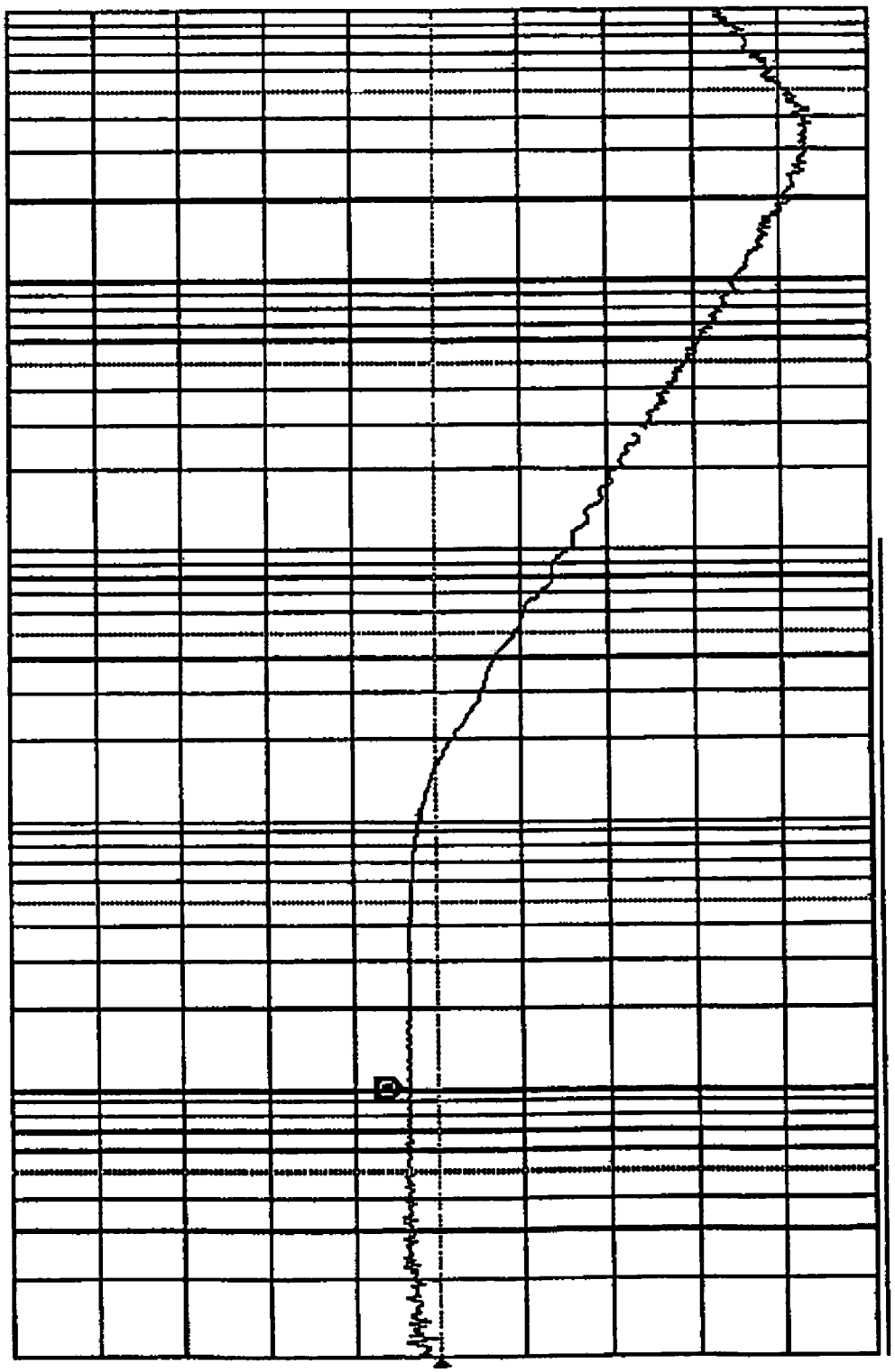
FIG. 11 shows the result of one measure made with the experimental setup of FIG. 10.

FIG. 10 shows the experimental setup used for point b) with a counter-propagating configuration of a Raman amplifier. The same reference numbers of FIG. 5 are used for corresponding elements. For this series of measures, the low-frequency modulator 51 was connected to the Raman pump source, in order to modulate the Raman gain. FIG. 11 shows the result visualized at the network analyzer in a frequency range between 10 Hz and 1 MHz, for an input power of the optical signal in the Raman medium of 18 dBm, a Raman gain of 0.7 dB and a modulation depth applied by the low-frequency modulator 51 of 17.7%. Each division in the y-axis corresponds to an attenuation of 10 dB. The length of the Raman fiber was 40 km. As it can be seen, a low-pass behavior is shown, with a threshold of about 1 kHz, definitely unacceptable for supervisory purposes.

Thus, a counter-propagating Raman amplifier does not allow the generation of a supervisory signal of typical frequencies by modulation of its gain.

Experiment 4

Figure 12:
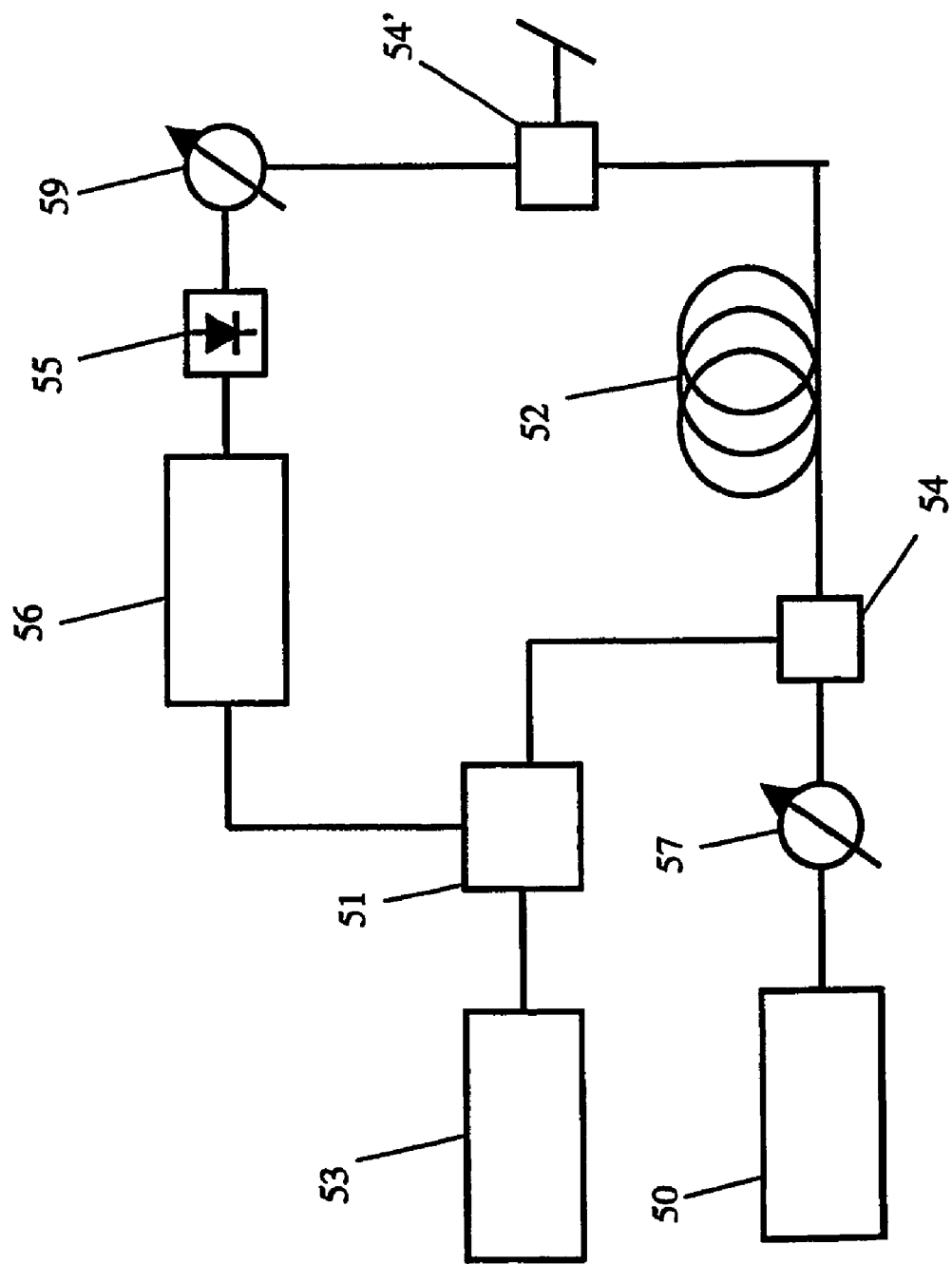
FIG. 12 schematically shows a third experimental setup used by the Applicant for evaluating how efficiently a co-propagating Raman amplifier may generate a low-frequency supervisory signal by modulation of its gain.
Figure 13:
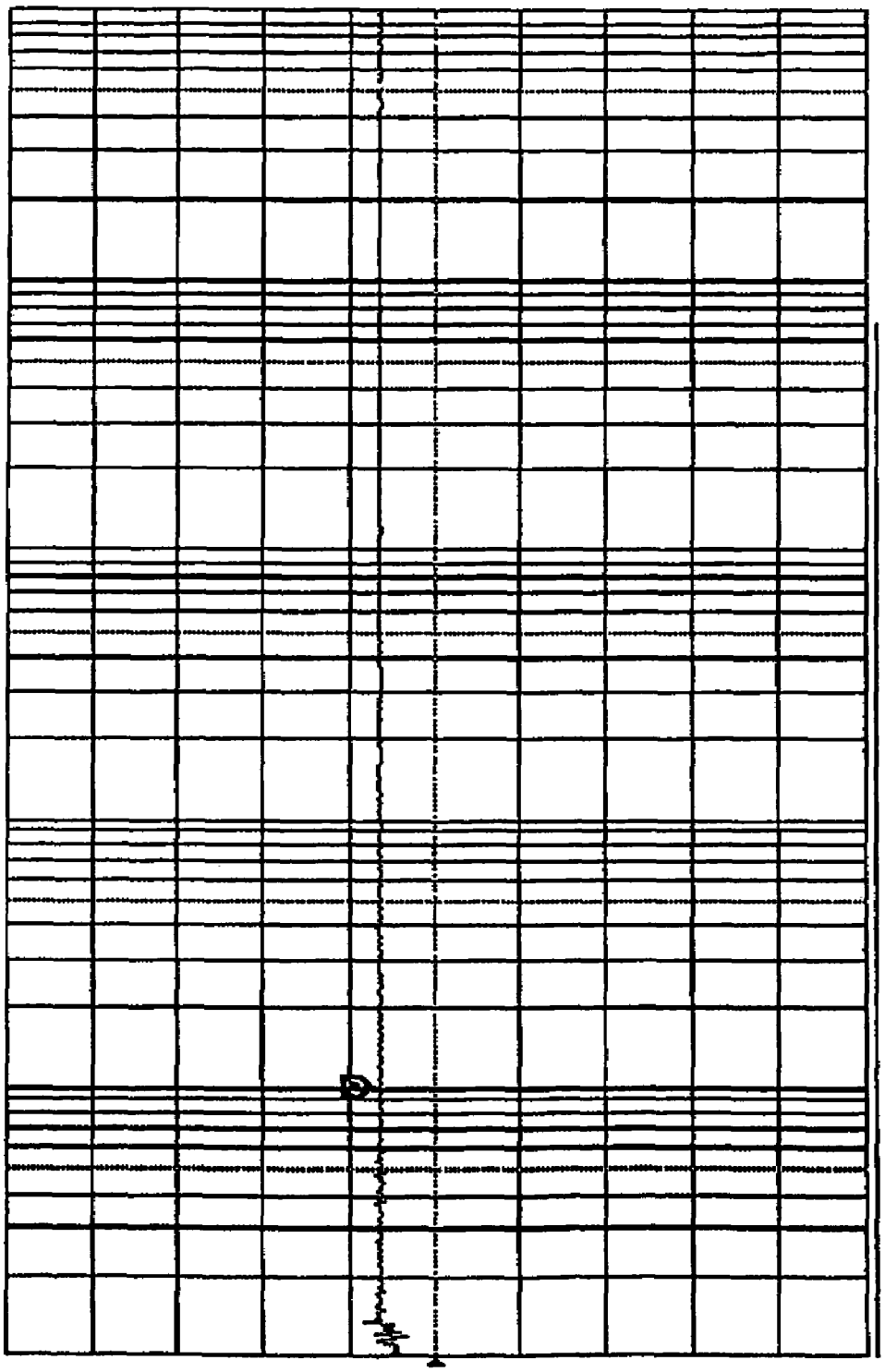
FIG. 13 shows the result of one measure made with the experimental setup of FIG. 12.

FIG. 12 shows the experimental setup used for point b) with a co-propagating configuration of a Raman amplifier. The same reference numbers of FIG. 8 are used for corresponding elements. FIG. 13 shows the result visualized at the network analyzer in a frequency range between 10 Hz and 1 MHz, for an input power of the optical signal in the Raman medium of 18 dBm, a Raman gain of 1 dB and a modulation depth applied by the low-frequency modulator of 17.7%. The length of the Raman fiber was 40 km. As it can be seen, no low-pass behavior is shown this time.

Thus, a co-propagating Raman amplifier allows the generation of a supervisory signal of typical frequencies by modulation of its gain.

Experiment 5

A further series of measures similar to those shown with reference to experiments 3 and 4 was done in order to evaluate the attenuation introduced on the modulation depth index m, both in counter-propagating and co-propagating configurations. The pump laser was modulated with different frequencies and with different modulation depths in a range comprised between 10 Hz and 1 MHz: for each frequency and modulation depth, the attenuation introduced on the modulation depth index m at the exit of the Raman medium was evaluated.

Table 2 resumes the obtained results with an input power of the optical signal in the Raman medium of 15 dBm and a Raman gain of 3 dB, in co-propagating configuration.

TABLE 2

| frequency [KHz] | m | Attenuation on m [dB] |
|---|---|---|
| 0.01 | 10.50% | −2.93 |
| 0.1 | 10.99% | −2.88 |
| 1 | 11.63% | −2.66 |
| 10 | 11.88% | −2.71 |
| 20 | 11.88% | −2.71 |

TABLE 2-continued

| frequency [KHz] | m | Attenuation on m [dB] |
|---|---|---|
| 40 | 12.02% | −2.66 |
| 100 | 10.41% | −2.62 |
| 300 | 3.98% | −2.50 |
| 500 | 2.02% | −2.32 |
| 1000 | 0.53% | −2.67 |

Table 3 resumes the obtained results with an input power of the optical signal in the Raman medium of 15 dBm and a Raman gain of 2.5 dB, in counter-propagating configuration. As it can be seen, at frequencies over 1 kHz the attenuation becomes higher and higher, so that it is not possible to obtain, at the exit of the Raman medium, an acceptable modulation depth.

TABLE 3

| frequency [KHz] | m | Attenuation on m [dB] |
|---|---|---|
| 0.01 | 8.73% | −3.73 |
| 0.1 | 8.73% | −3.88 |
| 1 | 7.73% | −4.43 |
| 10 | 0.81% | −14.38 |
| 20 | 0.62% | −15.53 |
| 40 | 0.20% | −20.37 |

Figure 14:
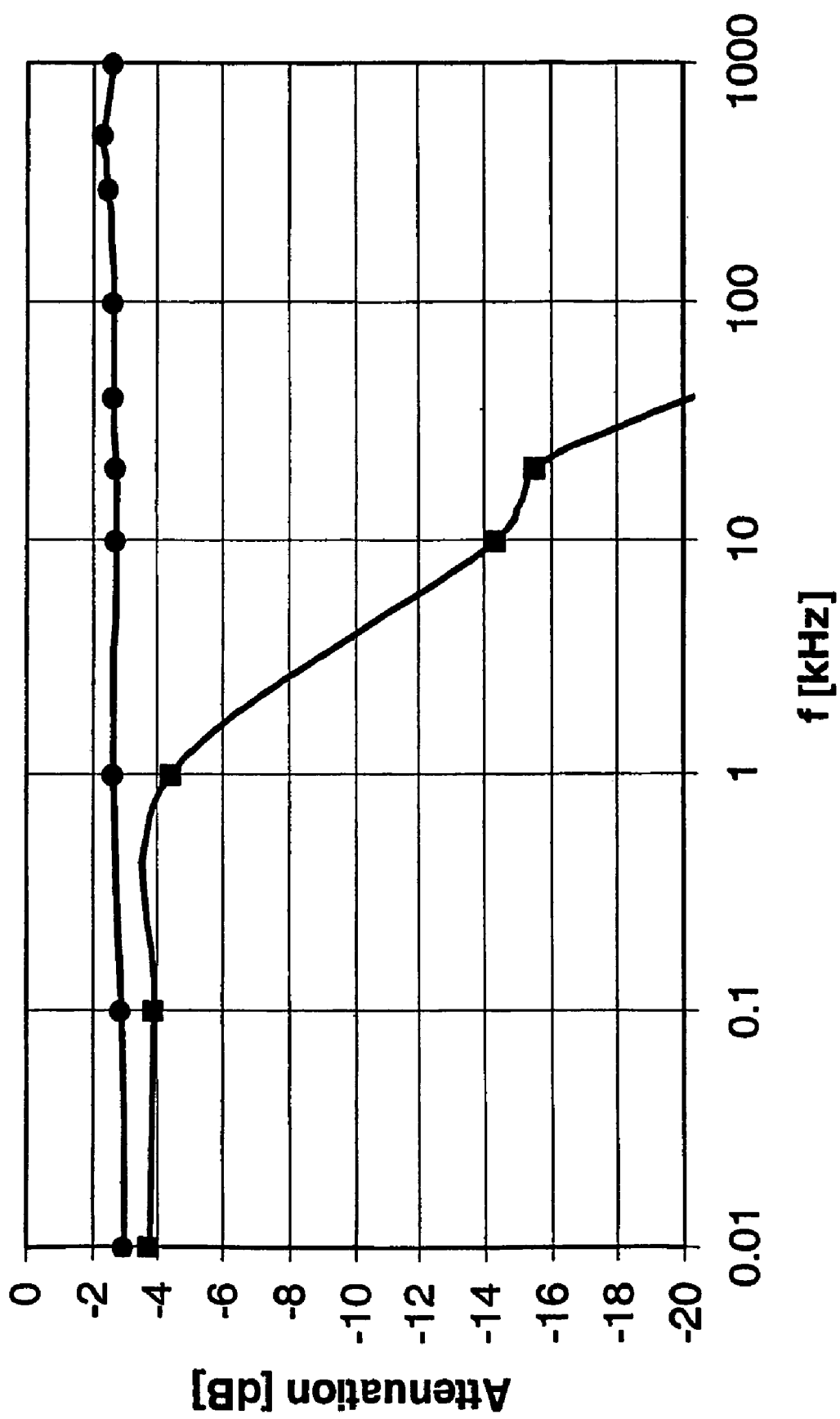
FIGS. 14 and 15 show plots of the attenuation introduced on the modulation depth index at the exit of a counter-propagating Raman amplifier with modulation of its gain (squares) and of a co-propagating Raman amplifier with modulation of its gain (dots), respectively with an input power of the optical signal of 15 dBm and 5 dBm.

FIG. 14 shows the obtained results in a plot having the frequency in the x-axis and the attenuation on m in the y-axis. The curve with dots represents the behavior of the co-propagating Raman amplifier with gain modulation, the curve with squares represents the behavior of counter-propagating Raman amplifier with gain modulation.

Figure 15:
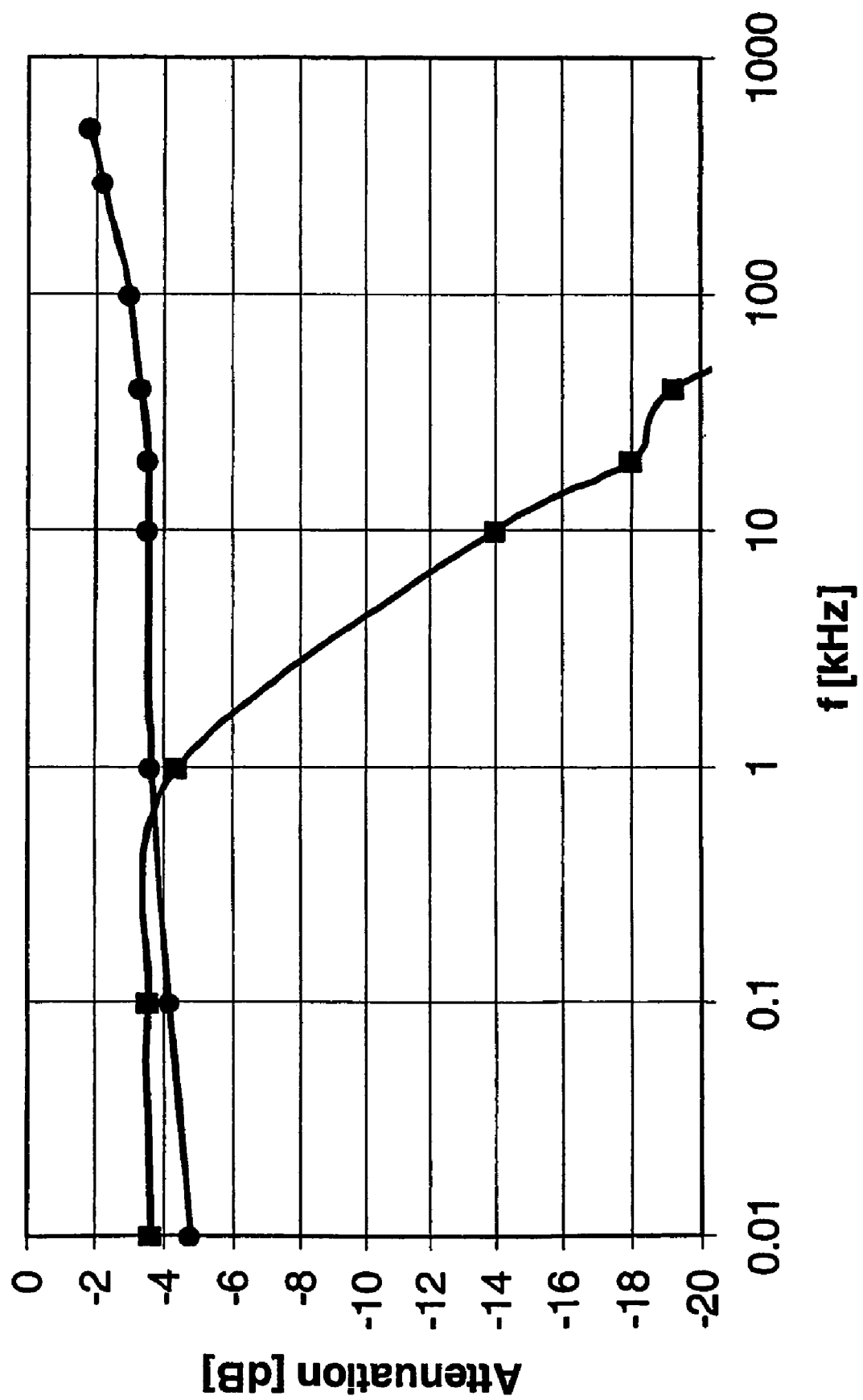

FIG. 15 shows the results of a measure obtained according to what stated above, obtained by reducing the input power in the Raman medium to 5 dBm. As it can be seen, similar behaviors are obtained with respect to FIG. 14 for the co-propagating and counter-propagating configurations.

Implementation of the Supervisory System

Figure 1:
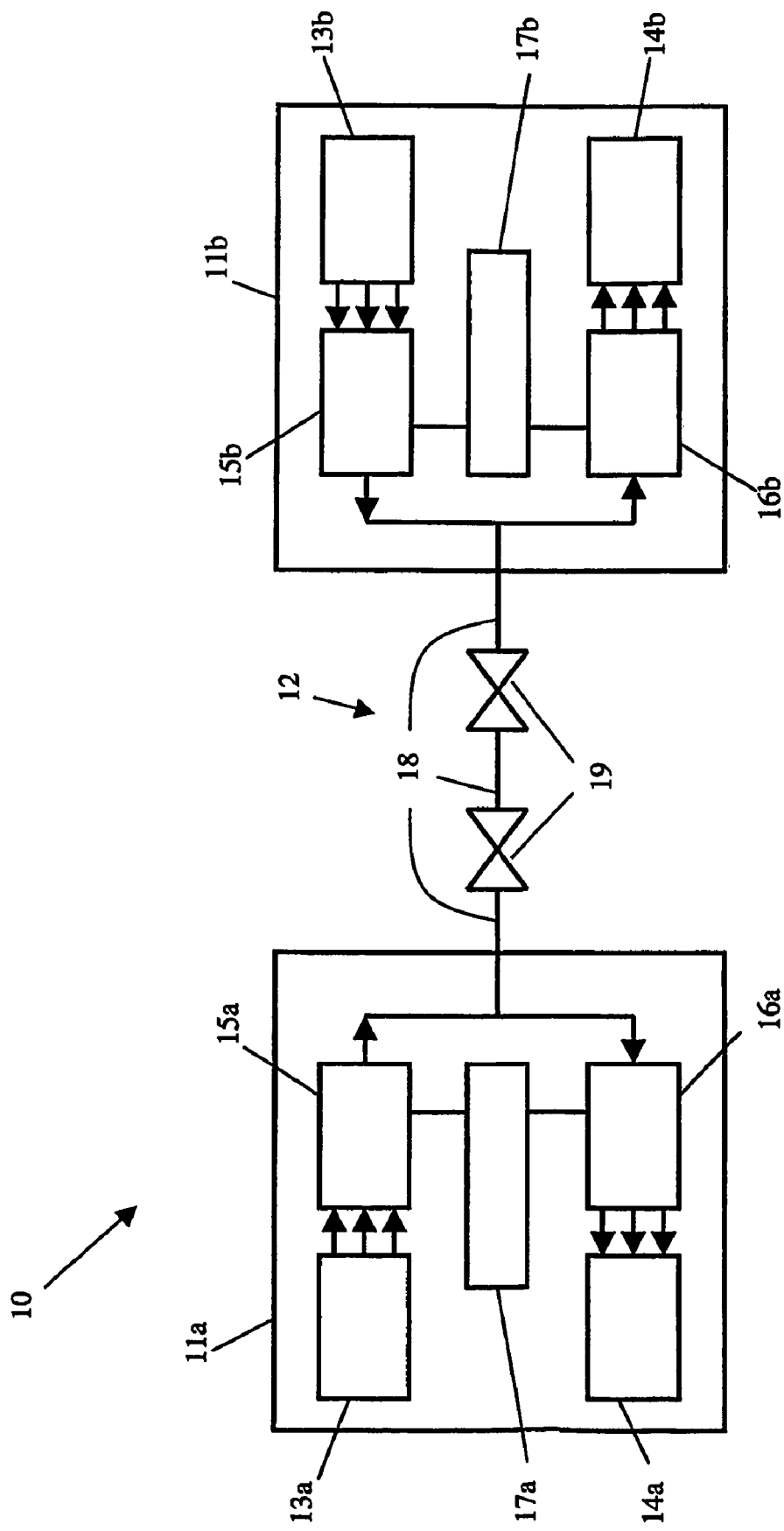
FIG. 1 schematically shows an optical transmission system according to the invention.

FIG. 1 schematically shows an optical transmission system 10 according to the invention, comprising two terminal stations 11a, 11b, typically adapted to transmit and receive optical signals over an optical link 12. For these purposes, terminal stations 11a, 11b each comprise at least one transmitter 13a, 13b and at least one receiver 14a, 14b. For WDM transmission, terminal stations 11a, 11b comprise a plurality of transmitters and receivers, for example twenty or thirty-two or sixty-four or one hundred transmitters and receivers.

Typically, each transmitter 13a, 13b comprises a laser source, adapted to emit a continuous wave optical signal having a predetermined wavelength, and an external optical modulator, for example a lithium niobate modulator, adapted to superimpose on the continuous wave optical signal emitted by the laser source a traffic signal at a predetermined high frequency or bit rate, such as for example 2.5 Gbit/s, 10 Gbit/s or 40 Gbit/s. Alternatively, the laser source may be directly modulated with the traffic signal. A preferred wavelength range for the optical signal is between about 1460 nm and about 1650 nm. A more preferred wavelength range for the optical signal is between about 1520 nm and about 1630 nm. Typically, in case of WDM transmission each transmitter may also comprise a variable optical attenuator, adapted to set a predetermined power level for each signal wavelength (pre-emphasis level). Preferably, the traffic signal may be coded with a FEC (Forward Error Correction) code in order to maintain good transmission characteristics of the optical signal (e.g. low bit-error-rate and/or signal-to-noise-ratio). In case of WDM transmission, the different signal wavelengths emitted by the plurality of transmitters 13a, 13b are multiplexed by a suitable multiplexing device 15a, 15b on a single optical path. Such multiplexing device can be any kind of multiplexing device (or combination of multiplexing devices), such as a fused fiber or planar optics coupler, a Mach-Zehnder device, an AWG (Arrayed Waveguide Grating), an interferential filter, a micro-optics filter and the like.

Each receiver 14a, 14b is adapted to convert an incoming optical signal in an electrical signal. Typically, this task may be provided by a photodetector. The receiver may also discriminate the traffic signal from the electrical signal. For a WDM transmission, a plurality of photodetectors is provided. A demultiplexing device 16a, 16b allows to separate the different signal wavelengths from a single optical path to a plurality of optical paths, each terminating with a receiver. The multiplexing device can be any kind of demultiplexing device (or combination of demultiplexing devices), such as a fused fiber or planar optics coupler, a Mach-Zehnder device, an AWG (Arrayed Waveguide Grating), an interferential filter, a micro-optics filter and the like.

At least one supervisory unit 17a, 17b is provided in the terminal stations 11a, 11b. The supervisory units 17a, 17b of the terminal stations are adapted at least to receive a portion of an optical signal coming from the optical link 12 and to discriminate from said portion of optical signal a supervisory signal superimposed by devices disposed along the optical link 12 on the optical signal, such superposition being carried out by techniques explained in the following. Typically, the supervisory units 17a, 17b of the terminal stations also provide for the generation of a supervisory signal to be superimposed on an optical signal before sending of the same on the optical link 12 by the terminal stations 11a, 11b.

The terminal stations 11a, 11b, typically comprise also a transmitter amplifier, preferably an optical amplifier (not shown), for amplifying the optical signal before sending of the same on the optical link 12. The transmitter amplifier is adapted to set the power of the optical signal to a suitable level, in order to counteract the attenuation introduced by a first portion of optical link 12. For a WDM transmission, the transmitter amplifier is typically disposed downstream the multiplexing device 15a, 15b.

The terminal stations 11a, 11b, typically also comprise a receiver amplifier, preferably an optical amplifier (not shown), for amplifying the optical signal coming from the optical link 12 before sending the same toward the receiver 14a, 14b. The receiver amplifier is adapted to set the power of the optical signal to a suitable level, for example in order to counteract the attenuation introduced on the optical signal by the last portion of the optical link 12 and/or by the optical devices comprised in the receiver 14a, 14b. For a WDM transmission, the receiver amplifier is typically disposed upstream the demultiplexing device 16a, 16b.

The optical link 12 typically comprises optical fibers 18. More particularly, the optical link 12 typically comprises a first optical fiber connecting the transmitter (or transmitters) 13a of the terminal station 11a to the receiver (or receivers) 14b of the terminal station 11b, and a second optical fiber connecting the transmitter (or transmitters) 13b of the terminal station 11b to the receiver 14a (or receivers) of the terminal station 11a. Optical fibers used in the optical link 12 are typically single mode fibers. For example, they can be standard single mode optical fibers (SMF), having chromatic dispersion lying between approximately +16 ps/(nm·km) and +20 ps/(nm·km) at a wavelength of 1550 nm, or dispersion-shifted fibers (DSF), having a dispersion approaching zero at a wavelength of 1550 nm, or NZD (non-zero dispersion) fibers, with dispersion of between approximately 1 ps/(nm·km) and 4.5 ps/(nm·km), in absolute value, at a wavelength of 1550 nm, or fibers of the HDS (half-dispersion-shifted) type having a positive dispersion which is intermediate between that of an NZD type fiber and a standard single-mode fiber. In order to counteract four-wave-mixing possibly occurring in WDM transmission, the fibers comprised in the optical link 12 may be disposed according to so-called "dispersion maps", that may include spans including NZD fibers and/or SMF fibers and/or HDF fibers having a positive dispersion, alternating with spans including dispersion compensating (DCF) fibers or NZD fibers having a negative dispersion. DCF fibers having a reversed dispersion slope may be used in the transmission system to reduce the dependence of the average dispersion on wavelength. In order to reduce the occurrence of FWM, the optical fibers included in the optical link 12 may have a dispersion which is greater than or equal to approximately 1 ps/(nm km) in absolute value at a wavelength of 1550 nm. Dispersion compensating gratings may be also used for dispersion compensation, preferably fiber gratings.

The optical link 12 comprises at least one repeater 19 comprising at least one pump source coupled to the optical link 12 in order to send on the optical link 12a pump radiation in the same direction of the optical signal traveling on the optical link 12, so as to cause co-propagating Raman amplification of the optical signal on at least a portion of the optical link 12 downstream the pump source. The repeaters 19 may be disposed at distances of about 50-100 km with each other. The pump radiation power may be set so as to cause a Raman gain in the range of between 10-25 dB. At the input of each span between two consecutive repeaters, the input power of the optical signal (i.e. the output power of the repeater) may be for example set in a range between 5 dBm and 18 dBm, in dependence of the number of wavelengths used for the optical signal. The optical link may further comprise erbium-doped fiber amplifiers in addition to Raman amplifiers.

Figure 2:
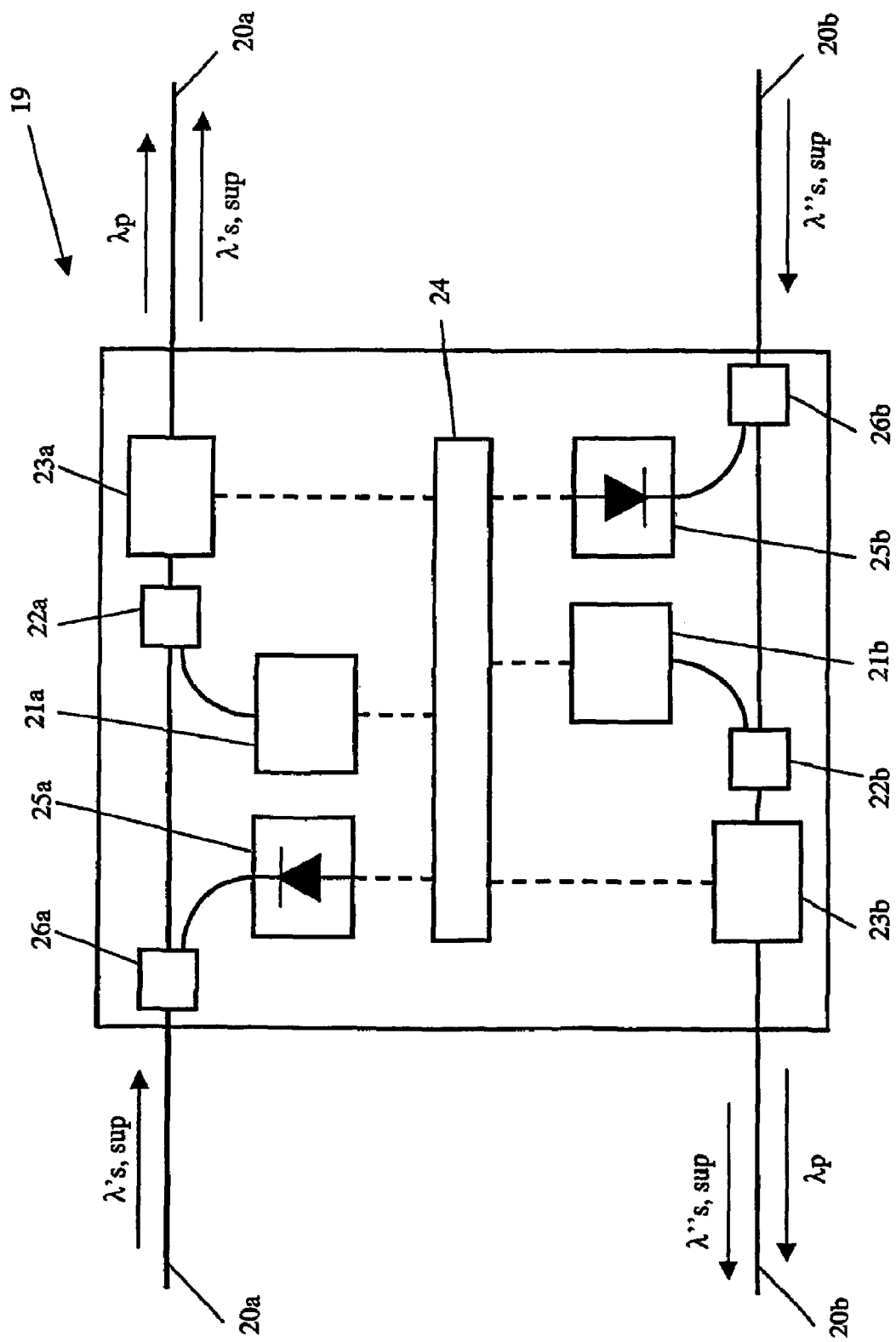
FIGS. 2 and 2b schematically show a first and a second preferred embodiments of a repeater according to the invention.

FIG. 2 schematically shows a first preferred embodiment of a repeater 19 according to the invention, being adapted to be disposed along an optical link comprising a first fiber 20a and a second fiber 20b. The first fiber 20a is adapted for transmitting optical signals $\lambda'_{s,sup}$ in a forward direction (from terminal station 11a to terminal station 11b, using the reference numbers of FIG. 1), while the second fiber 20b is adapted for transmitting optical signals $\lambda''_{s,sup}$ in a backward direction (from terminal station 11b to terminal station 11a, using the reference numbers of FIG. 1). The terms "forward" and "backward" are used only for exemplary purposes. In FIG. 2 optical connections have been represented with continuous lines, while electrical connections have been represented by dashed lines. The repeater 19 comprises at least a first pump source 21a, adapted for emitting a pump radiation having a wavelength $\lambda_p$. The pump radiation emitted by the first pump source 21a is coupled on the first optical fiber 20a through a WDM coupler 22a, in the same direction of an optical signal traveling on the first optical fiber 20a, so as to cause co-propagating Raman amplification of the same on the portion of the first fiber 20a downstream the pump source 21a. The wavelength $\lambda_p$ of the pump radiation emitted by the pump source 21a is shifted in a lower wavelength region with respect to the wavelength of the optical signal of a quantity approximately equal to the Raman-Stokes frequency shift (see G. P Agrawal, "Nonlinear fiber optics", Academic Press Inc. (1995), pag. 317-9) of the core material of the portion of first optical fiber 20a downstream the pump source 21a. For example, for silica-germania fibers the Raman-Stokes frequency shift is approximately equal to 13.2 THz. This corresponds, in a wavelength region around 1500-1600 nm, to a wavelength shift at lower wavelengths of about 100 nm. Thus, if the optical signal has a wavelength lying in the 1.5 μm band, a pump wavelength lying in the 1.4 μm band may be used, for example a pump wavelength of 1450 nm or even 1480 nm. The first pump source 21a may comprise a single pump laser or multiple pump lasers, according to the needs. Multiple pump lasers having different wavelengths may be used, for example, in order to obtain a wide and flat gain bandwidth, which is advantageous for a WDM transmission. In order to reduce polarization effects, preferably two pump lasers having substantially the same wavelength emission and substantially the same pump power are used for each pump wavelength, such two pump lasers being coupled together through a polarization beam splitter, so that a polarization independent pump radiation is outputted by the polarization beam splitter. The pump power emitted by each pump laser is typically higher than 200 mW.

Preferably, the repeater 19 further comprises a second pump source 21b, coupled to the second optical fiber 20b through a WDM coupler 22b, adapted for sending a pump radiation on the second optical fiber 20b in the same direction of an optical signal traveling on the second optical fiber 20b, so as to cause co-propagating Raman amplification of the same on the portion of the second fiber 20b downstream the pump source 21b. As far as the pump wavelength or wavelengths, the pump power, the number of pump lasers comprised in the pump source and the coupling of the pump lasers of the second pump source 21b, reference is made to what stated for the first pump source 21a.

In order to enhance the Raman effect in the portion of the first optical fiber 20a downstream the first pump source 21a and/or in the portion of the second optical fiber 20b downstream the second pump source 21b, the effective area of the fiber portion (or portions) may be preferably lower than or equal to about 80 μm$^2$, more preferably lower than or equal to 50 μm$^2$. The Raman amplification may occur in a substantial portion of a fiber span between two consecutive repeaters in the optical link or between a repeater and a terminal station (distributed Raman amplification), or in a small portion (not more than 5-10 km) of the same fiber span (lumped Raman amplification). For lumped Raman amplification, the effective area of the fiber portion in which Raman amplification occurs should preferably be lower of the values reported above, for example lower than or equal to 20 μm$^2$, in order to avoid use of too high pump powers. In case of a lumped fiber Raman amplifier, the length of fiber acting as Raman medium may be comprised in the repeater 19, for example by winding on a suitable drum.

Coming back to FIG. 2, the repeater 19 may further comprise a first low frequency modulator 23a connected to the first optical fiber 20a. In FIG. 2, the first low frequency modulator 23a is connected to the first optical fiber 20a downstream the coupling of the first pump source 21a. In an alternative embodiment, not shown, the first low-frequency modulator 23a may be connected to the first optical fiber 20a upstream the coupling of the pump source 21a. The modulator 23a is adapted to superimpose on the optical signal traveling on the first optical fiber 20a a low-frequency signal, according to a supervisory information. The expression "low-frequency" has to be intended relative to the frequency (or bit rate) of the traffic signal carried by the optical signal: a preferred range of frequencies for the low-frequency supervisory signal is up to about 10 MHz for a bit rate of the traffic signals higher than 1 Gbit/s. For higher traffic bit rates (for example 10 or 40 Gbit/s), the low-frequency supervisory signal may also reach higher frequency values, such as 50-100 MHz. In order to superimpose a sufficient quantity of informations, the supervisory signal may be preferably have a frequency higher than or equal to 5 kHz, more preferably higher than or equal to 10 kHz.

The modulator 23a may be any kind of device being capable of superimposing a low-frequency signal on the optical signal traveling on the first fiber 20a. The low-frequency supervisory signal is added to the optical signal with a modulation depth preferably not lower than 2%, more preferably not lower than 4%. In order to avoid disturbances on the traffic signal carried by the optical signal, the modulation depth of the supervisory signal may be preferably lower than or equal to 25%, more preferably lower than 20%, even more preferably lower than 10%.

For example, the modulator may be a lithium niobate or semiconductor modulator. In an alternative embodiment, the modulator may be a tunable band pass filter, as described in the patent U.S. Pat. No. 6,111,687.

In a preferred embodiment, the modulator 23a may be a variable optical attenuator, modulated at a certain modulation depth about an operating point. The operating point of the variable optical attenuator may be chosen in order to regulate one or more operating characteristics of the repeater, such as the input power of the optical signal in the fiber span following the repeater itself. More preferably, the variable optical attenuator may be a magneto-optical variable attenuator, which advantageously may be embodied in a very compact device and can be piloted with very low driving currents of the order of tens of mA. Further, magneto-optical attenuators have proven to be very reliable, making them suitable, in particular, for use in submarine systems. A suitable magneto-optical attenuator usable in the repeater according to the invention in order to superimpose on the optical signal a supervisory signal is the model YS-500, produced by FDK Corporation, which can allow supervisory signal modulation up to frequencies of about 300 kHz without substantial variation of the modulation depth over a wavelength range comprised between about 1530 nm and 1560 nm.

Preferably, the repeater 19 may also comprise a second low-frequency modulator 23b connected to the second optical fiber 20b. In FIG. 2, the second low frequency modulator 23b is connected to the second optical fiber 20b downstream the coupling of the second pump source 21b. In an alternative embodiment, not shown, the second low-frequency modulator 23b may be connected to the second optical fiber 20b upstream the coupling of the pump source 21b. The modulator 23b is adapted to superimpose on the optical signal traveling on the second optical fiber 20a a low-frequency signal, according to a supervisory information. The second low-frequency modulator 23b can be any of the types of modulators already descried with reference to the first modulator 23a. Preferably, the first and the second modulators 23a, 23b are of the same type.

The repeater 19 may also comprise at least one supervisory unit 24 associated at least to said first low-frequency modulator 23a. The supervisory unit 24 is adapted to generate a first electrical supervisory signal, that can be applied to a driving circuit of the modulator 23a in order to superimpose the supervisory signal on the optical signal. Preferably, the supervisory unit 24 may be further associated to the first pump source 21a, in order to sense and preferably regulate the pump power emission of the same. Further, the supervisory unit 24 may be also preferably associated to the second low-frequency modulator 23b. A second electrical supervisory signal may be generated in the supervisory unit 24, to be applied to a driving circuit to the second low-frequency modulator 23b. Further, the supervisory unit may be also preferably associated to the second pump power source 21b, in order to sense and preferably regulate the pump power emission of the same. A preferred embodiment of a supervisory unit suitable for use in the repeater 19 will be described in the following.

The repeater 19 further comprises at least a first photodetector 25a. This is connected to a first optical power splitter 26a, that splits a portion of optical signal traveling on the first optical fiber 20a (for example 5%-10% of the power of the optical signal) and sends such portion of optical signal towards the photodetector 25a. The photodetector 25a converts the portion of optical signal in an electrical signal. Such electrical signal may be fed to the supervisory unit 24.

Preferably, the repeater 19 further comprises at least a second photodetector 25b. This is connected to a second optical power splitter 26b, that splits a portion of optical signal traveling on the second optical fiber 20b (for example 5%-10% of the power of the optical signal) and sends such portion of optical signal towards the photodetector 25b. The photodetector 25b converts the portion of optical signal in an electrical signal. Such electrical signal may be fed to the supervisory unit 24.

Figure 2B:
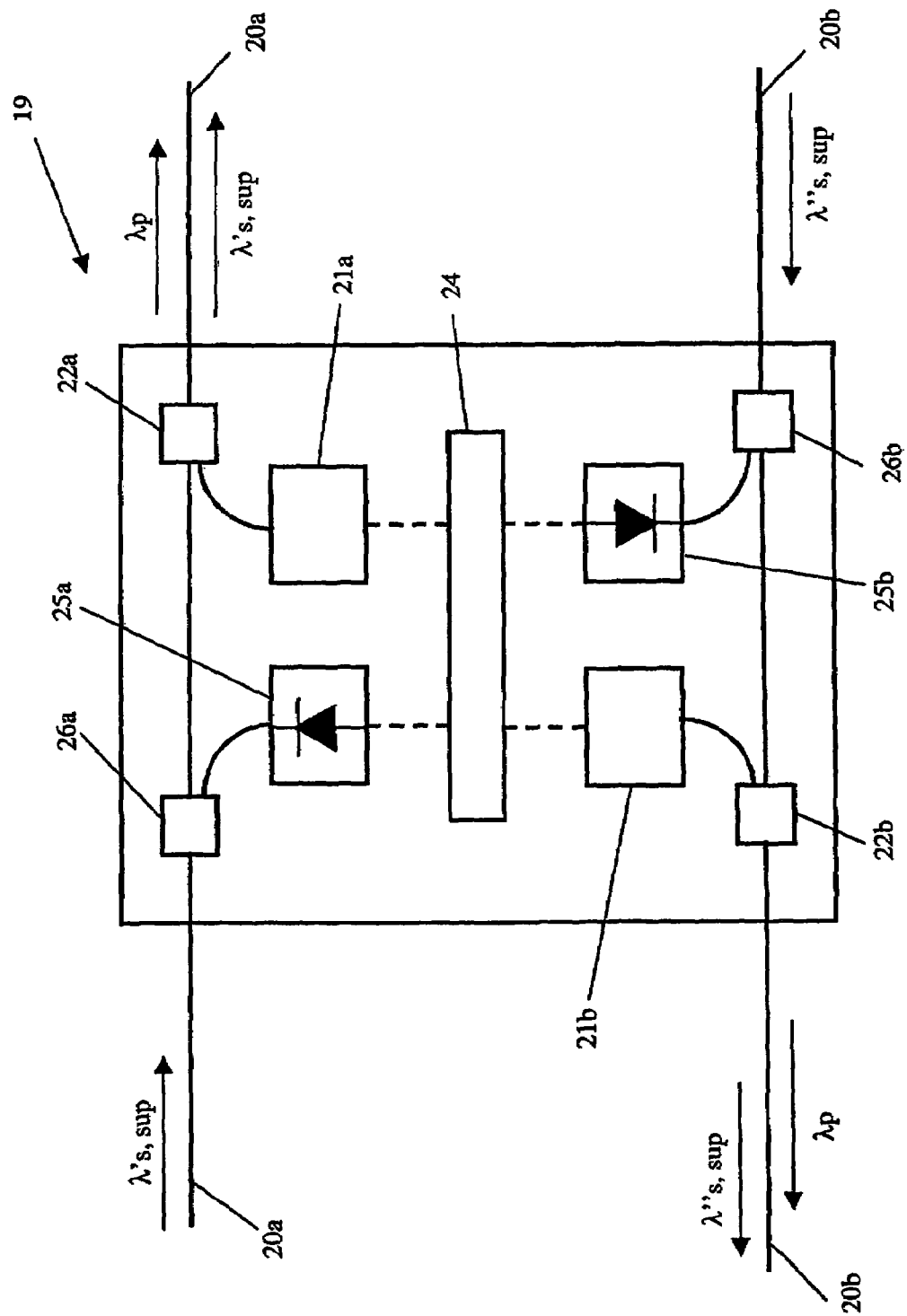

FIG. 2b shows a second preferred embodiment of a repeater 19 according to the invention, in which the modulators 23a, 23b are lacking. In such case, the superposition of the supervisory signal on the optical signal may be provided by modulating one or both the first and the second pump sources 21a, 21b, so as to modulate the Raman gain in the portions of the first ad/or the second optical fibers 20a, 20b downstream the repeater 19. Such Raman gain modulation is then transferred to the optical signal. In such way, supervisory signals having a frequency up to several 10 MHz can be advantageously superimposed on the optical signal, as the Raman effect has a very fast response time. Thus, in the preferred embodiment of FIG. 2b, the co-propagating Raman amplification is exploited also for superimposing on the optical signal the supervisory signal.

With reference to either FIG. 2 or FIG. 2b, the functioning of the repeater 19 will be explained hereinafter. A first optical signal carrying a high frequency traffic signal and possibly a low-frequency supervisory signal $\lambda'_{s,sup}$ travels on the first optical fiber 20a in a forward direction. For example, the supervisory signal carried by the first optical signal comprises an interrogation signal on the operating state of the repeater 19, e.g., its environment temperature, or the operating temperature of the pump sources 21a, 21b, or the pump power of the pump sources 21a, 21b. Such interrogation signal was typically superimposed on the first optical signal in a first terminal station. The power splitter 26a splits a portion of the first optical signal and sends it towards the photodetector 25a, which transforms the same in an electrical signal. Such electrical signal is fed to the supervisory unit 24, which discriminates the interrogation signal and may elaborate the same in order to understand if such interrogation signal is addressed to the repeater 19 or to a subsequent repeater. In the former case, typically an electrical response supervisory signal is generated in the supervisory unit 24, comprising the informations on the operating state of the repeater requested. The supervisory unit 24 then may apply the supervisory response signal to the driving circuit of the second low-frequency modulator 23b (FIG. 2) or to the driving circuit of the second pump source 21b (FIG. 2b), so that the supervisory response signal may be superimposed to a second optical signal carrying a high frequency traffic signal and possibly another low-frequency supervisory signal $\lambda''_{s,sup}$, traveling on the second optical fiber 20b in a backward direction. In a preferred embodiment, the supervisory response signal is also applied to the driving circuit of the first low-frequency modulator 23a (FIG. 2) or to the driving circuit of the first pump source 21a (FIG. 2b), so that the supervisory response signal is superimposed on the optical signals traveling in both forward and backward directions on the optical link. According to an alternative embodiment, the supervisory response signal is only applied to the driving circuit of the first low-frequency modulator 23a (FIG. 2) or to the driving circuit of the first pump source 21a (FIG. 2b), so that the supervisory response signal is superimposed on the optical signal traveling in a forward direction toward a second terminal station. Such second terminal station then may send the response signal to the first terminal station by using an external line, for example a public switched telephone (PSTN) line.

In place of or combined with the interrogation signal, the supervisory signal carried by the first optical signal $\lambda'_{s,sup}$ may comprise a command signal in order to regulate one operating parameter of the repeater 19, such as for example the pump power of the Raman pump sources 21a, 21b or the operating point of the low-frequency modulators 23a, 23b.

Clearly, an analogous functioning of the repeater 19 may be described with reference to a second optical signal $\lambda''_{s,sup}$ traveling on the second optical fiber 20b in backward direction, possibly carrying a low-frequency supervisory signal.

Figure 3:
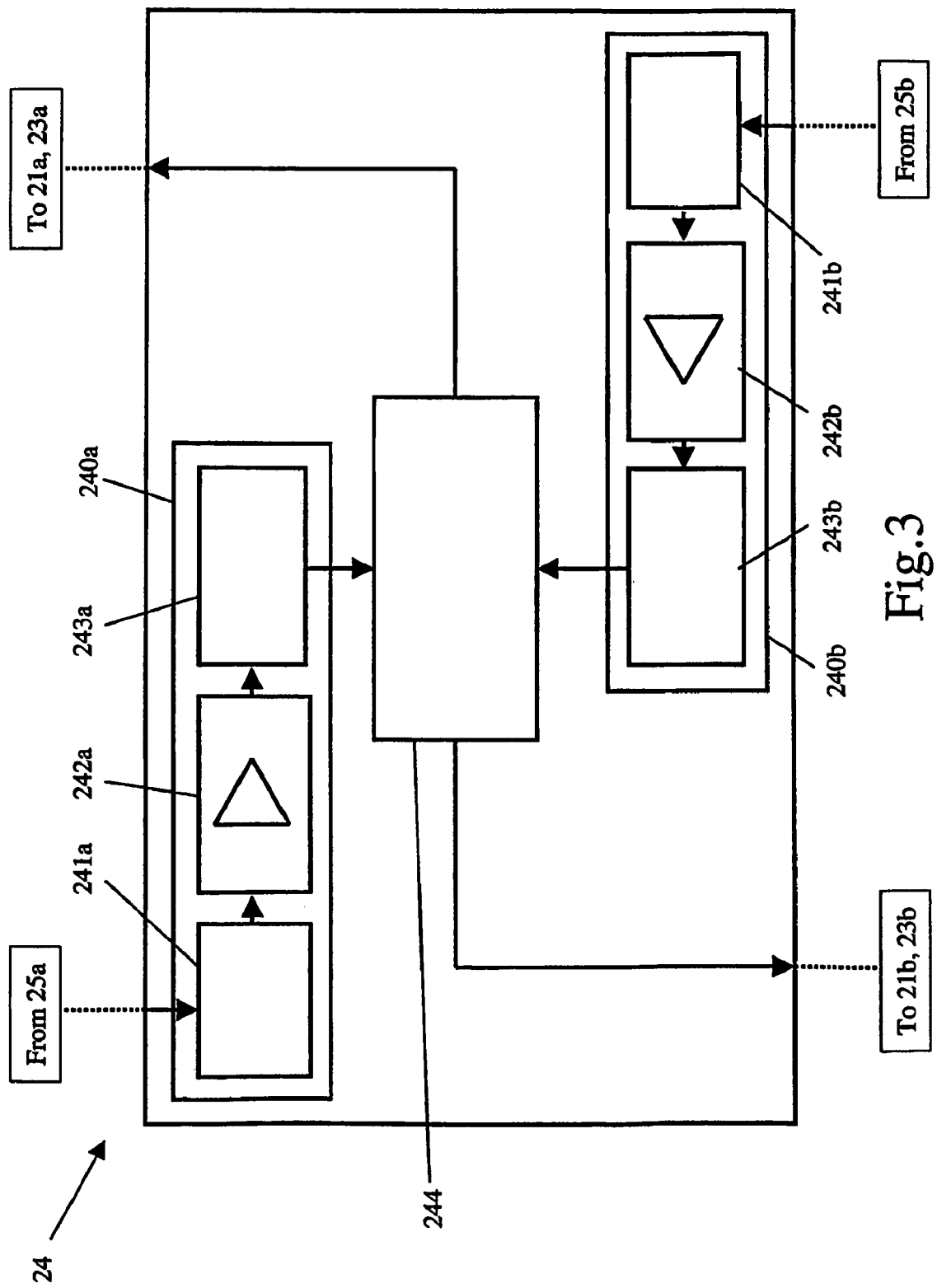
FIG. 3 schematically shows an exemplary supervisory unit suitable for a repeater according to the invention.

FIG. 3 schematically shows a preferred supervisory unit 24 that may be used in the repeater 19 of FIG. 2 or FIG. 2b. The supervisory unit 24 may comprise at least one electrical filtering unit 240a, 240b. For example, the filtering units 240a, 240b may comprise at least one filtering circuit 241a, 241b, at least one amplifying circuit 242a, 242b, at least one threshold circuit 243a, 243b. The supervisory unit may further comprise a processing unit 244. Circuits used in the supervisory unit 24 may be realized with ordinary components. Processing unit 244 may be for example a conventional processing unit of the ASIC (Application Specific Integrated Circuit) or of the FPGA (Field Programmable Gate Array) type.

With reference to FIG. 3, a first electrical signal coming from photodiode 25a (see FIG. 2 or FIG. 2b) is inputted in the supervisory unit 24. A second electrical signal coming from photodiode 25b may be also inputted in the supervisory unit 24. The filtering units 240a, 240b provide for extraction of the supervisory signal lying in the low-frequency band from the traffic signal lying in the high-frequency band. In the exemplary embodiment of FIG. 3, the filtering circuits 241a, 241b allow the extraction of the supervisory signal low-frequency band from the traffic signal high-frequency band and the amplifying circuits 242a, 242b allow amplification of the electrical signal in output from the filtering circuits 241a, 241b. The amplifying circuit 242a, 242b may also be disposed before the filtering circuit 241a, 241b. Downstream the filtering and amplifying circuits a threshold circuit 243a, 243b, typically comprising a peak detector and a comparator circuit, may determine the presence or the absence of a supervisory signal. In presence of a supervisory signal, the threshold circuit may feed the signal to the processing unit 244, which is suitable to process the supervisory signal, in order to check whether there are command and/or interrogation signals addressed to the repeater. In this case, the processing unit 244 may execute the commands contained in such signals (for example, it regulates the pump power of the pump source or sources 21a, 21b for Raman amplification) and/or may generate response signals (for example, comprising informations on the operating status of the repeater). Such response signal may be fed by the processing unit 244 to the driving circuit of at least one of modulators 23a, 23b (see FIG. 2) or of at least one of the pump sources 21a, 21b (see FIG. 2b). Typically, the response signal is sent in both directions on the optical link: for this purpose, the response signal is fed to both modulators 23a, 23b or pump sources 21a, 21b. The processing unit 244 may also generate supervisory signals to be fed to at least one of the modulators 23a, 23b or pump sources 21a, 21b independently of a specific interrogation signal coming from the terminal stations, for example by continuously sending informations on the operating state of the repeater for monitoring purposes.

If the supervisory signal is not addressed to the repeater (either because such supervisory signal was sent by a previous repeater for response to an interrogation signal or because the supervisory signal comprises an interrogation signal addressed to another repeater), the processing unit 244 may simply re-transmit such supervisory signal coming from the line to the subsequent repeater. In such case, the processing unit 244 simply feeds to the driving circuits of one of the low-frequency modulators 23a, 23b or pump sources 21a, 21b the extracted and amplified supervisory signal, for re-transmission to the subsequent repeater. The retransmission of the extracted and amplified supervisory signal in at least one of the repeaters of the optical link comprising co-propagating Raman amplifiers allows to overcome the problem of the attenuation introduced on the low-frequency supervisory signals in the passage through the co-propagating Raman amplifiers. The Applicant has found that the attenuation level introduced on the low-frequency supervisory signal from the input to the output of a co-propagating Raman amplifier may depend on many factors, such as the input power of the optical signal in the span between two repeaters or the gain of the co-propagating Raman amplifier. In particular, the higher the gain, the higher the attenuation. This may cause the loss of the supervisory signal after the passage through even a few number of repeaters, if the supervisory signal is not regenerated in at least one of the repeaters. For example, an attenuation of about 1.8 dB on the supervisory signal for each co-propagating Raman amplifier may cause the substantial loss of the supervisory signal after less than ten repeaters. On the other hand, the regeneration of the supervisory signal performed by the supervisory unit 24 comprised in the repeater 19, according to what stated above, allows to maintain a suitable strength of the supervisory signal, i.e. allows to counteract the attenuation introduced by the co-propagating Raman amplifiers.

A supervisory unit suitable for regenerating the supervisory signal carried by the optical signal may also be provided in devices other than repeaters, disposed along the optical link 12. Such devices may also be provided of a modulator suitable for superimposing on an optical signal a low-frequency supervisory signal, associated to the supervisory unit. For example, the supervisory unit and the low-frequency modulator can be provided in a branching unit disposed in a point of a submarine optical link, such branching unit being suitable for routing all or part of the traffic and/or supervisory signals toward a third terminal station disposed at the end of a spare optical link. The branching unit may also comprise a photodetector connected through an optical power splitter to the optical link, adapted for receiving a portion of optical signal possibly carrying a low-frequency supervisory signal and associated to the supervisory unit. Preferably, the branching unit may comprise two low-frequency modulators, being adapted to superimpose a supervisory signal generated in the supervisory unit on an optical link in both forward and backward directions. Preferably, the branching unit may comprise two photodetectors for receiving portions of optical signal possibly carrying supervisory signals coming from both forward and backward directions, the photodetectors being associated with the supervisory unit. A third low-frequency modulator may be provided for superimposing a supervisory signal on an optical signal sent on the spare link. A third photodetector may be provided for receiving portions of optical signal possibly carrying supervisory signals coming from the spare link, the third photodetector being associated with the supervisory unit.

Low-frequency supervisory signals may be superimposed to the optical signal at the terminal stations in any suitable manner. For example, the supervisory signal may be added at the transmitter, by modulating the driving current of the laser diode emitting the optical signal with the supervisory signal. This technique may be disadvantageous in WDM systems, wherein multiple laser diodes are present, so that the driving current of each laser diode should be modulated. This may require a proper control electronics for the direct modulation of each laser source, and may imply an increase in complexity of electric connections and wiring, in costs and in dimensions. Moreover, it may need a complex calibration of the modulation depth for each laser source.

Preferably, the superposition of the supervisory signal at the terminal station may be performed downstream the transmitter by a suitable low-frequency modulator. This technique may be used also for WDM transmission: in such case the low-frequency modulator may be advantageously disposed downstream the multiplexing device, so that the supervisory signal may be superimposed on the whole WDM optical signal with a single electrical connection. As far as the low-frequency modulator that may be used in the terminal stations, it may be any of the low-frequency modulators described above with reference to the optical repeater of FIG. 2. For example, the low-frequency modulator may be the transmitter optical amplifier, which gain may be modulated with the supervisory signal. Such transmitter optical amplifier may be for example a co-propagating Raman amplifier, i.e. a pump source may be disposed in the terminal station coupled to the input of the optical link, so as to couple a pump radiation on the optical link in the same direction of the optical signal. The pump source may be modulated with the supervisory signal, so that the supervisory signal is superimposed on the optical signal during Raman amplification of the same. In another preferred embodiment, the low-frequency modulator may be an optical variable attenuator, more preferably a magneto-optical variable attenuator. A suitable magneto-optical variable attenuator is the model YS-500, produced by FDK Corporation.

Figure 4:
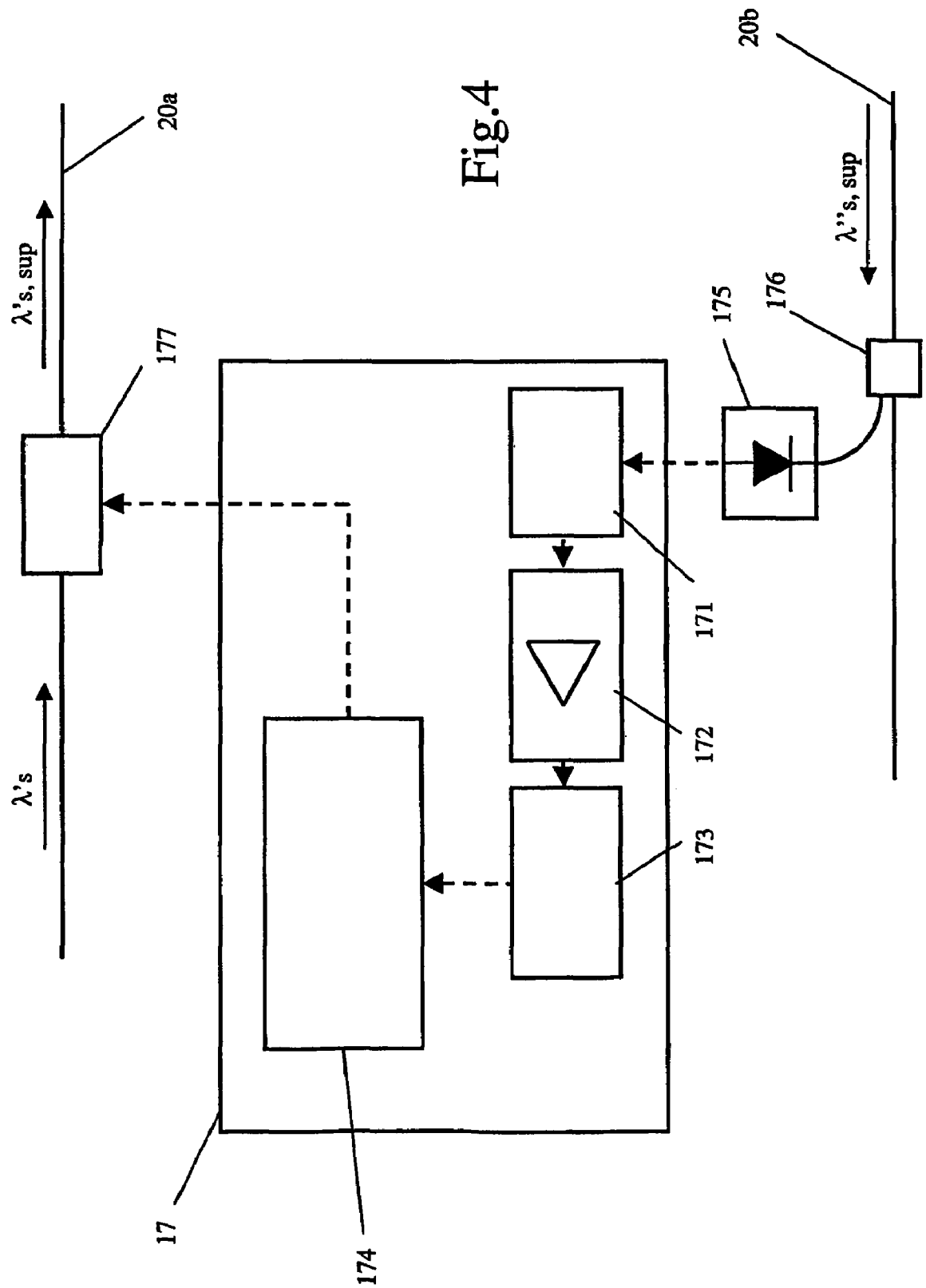
FIG. 4 schematically shows an exemplary supervisory unit suitable for a terminal station of an optical system according to the invention.

FIG. 4 schematically shows an exemplary supervisory unit 17 that can be used in a terminal station of the optical transmission system according to the invention. The supervisory unit is connected to a photodetector 175 which transforms a portion of optical signal coming from a first optical fiber 20*b*, possibly carrying a supervisory signal coming from a device disposed along the optical link (e.g. a repeater), in an electrical signal. An optical power splitter 176 (e.g. a 90/10 coupler), coupled to the first fiber 20*b*, may be used for splitting the portion of optical signal. The electrical signal is fed to a filtering circuit 171 and an amplifying circuit 172 of the supervisory unit 17. The filtering circuit 171 discriminates the low-frequency supervisory signal from the high frequency traffic signal. The amplifying circuit 172 amplifies the electrical signal. Downstream the filtering and amplifying circuits an analog/digital converter 173 may convert the electrical analog signal in an electrical digital signal. Such digital signal is then passed to a processing unit 174. For example, the processing unit 174 may be a conventional processing unit of the DSP (Digital Signal Processor) type, suitable to perform a peak detection of the electrical signal and an operation of comparison with a predetermined threshold for determining the presence or absence of the supervisory signal. The processing unit 174 may also generate a supervisory signal to be sent on the optical link by superposition on the optical signal. Such supervisory signal is then passed, for example, to the driving circuit of a low-frequency modulator 177, connected to a second optical fiber 20*a*.

The invention claimed is:

1. An optical transmission system comprising:
at least a first and a second terminal station, optically connected with each other by an optical link, said first or said second terminal station being configured to send on said optical link at least a first optical signal having a first direction;
at least a first pump source disposed along said optical link, said pump source being configured to send on said optical link a pump radiation in said first direction, so as to cause Raman amplification of said first optical signal; and
at least one device disposed along said optical link;
said device comprising:
at least a first photodetector configured for converting a portion of said first optical signal in an electrical signal; and
a first supervisory unit configured for amplifying said electrical signal, for extracting a first supervisory signal from said electrical signal, and for feeding said extracted amplified first supervisory signal to at least a first modulator connected to said optical link or to a driving circuit of said pump source, so as to superimpose said extracted amplified first supervisory signal on said first optical signal, wherein said first modulator is not said first pump source, and a network analyzer is coupled between said modulator and a photodiode.

2. The optical transmission system according to claim 1, wherein said first supervisory signal comprises at least an information signal on an operating state of said device.

3. The optical transmission system according to claim 1, wherein said device disposed along said optical link is a repeater and said at least first pump source is in said repeater.

4. The optical transmission system according to claim 3, wherein said first supervisory unit is associated to said first pump source.

5. The optical transmission system according to claim 1, wherein said modulator is a lithium niobate modulator.

6. The optical transmission system according to claim 1, wherein said modulator is a semiconductor modulator.

7. The optical transmission system according to claim 1, wherein said modulator is a tunable band-pass filter.

8. The optical transmission system according to claim 1, wherein said modulator is a variable optical attenuator.

9. The optical transmission system according to claim 8, wherein said variable optical attenuator is a magneto-optical variable attenuator.

10. The optical transmission system according to claim 1, wherein said optical link comprises at least a first optical fiber and a second optical fiber, said first optical fiber configured to carry said first optical signal in said first direction and said second optical fiber configured to carry a second optical signal in a second direction, opposite to said first direction.

11. The optical transmission system according to claim 10, wherein said device comprises at least a second pump source, said second pump source configured to send on said second optical fiber a pump radiation in said second direction, so as to cause Raman amplification of said second optical signal.

12. The optical transmission system according to claim 11, wherein said device comprises at least a second photodetector, configured for converting a portion of said second optical signal in into a second electrical signal.

13. The optical transmission system according to claim 12, wherein said first supervisory unit is configured for amplifying said second electrical signal, for extracting a second supervisory signal from said second electrical signal, and for feeding said extracted amplified second supervisory signal to at least a second modulator connected to said second optical fiber or to a driving circuit of said second pump source, so as to superimpose said extracted amplified second supervisory signal on said second optical signal.

14. The optical transmission system according to claim 13, wherein said first supervisory unit is configured for generating at least a third supervisory signal, and for feeding said third supervisory signal to a driving circuit of said first or second pump source or to said first or said second modulator, so as to superimpose said third supervisory signal on said first or second optical signal.

15. The optical transmission system according to claim 14, wherein said first or said second terminal station comprises a second supervisory unit, configured to receive at least a portion of said first or said second optical signal from said optical link and discriminate from said first or said second optical signal said first, second or said third supervisory signal.

16. The optical transmission system according to claim 15, wherein said second supervisory unit is configured to generate a fourth supervisory signal to be superimposed on said first or said second optical signal.

17. The optical transmission system according to claim 16, wherein said first or said second optical signal is a WDM optical signal.

18. The optical transmission system according to claim 17, wherein said first or said second terminal station comprises a plurality of transmitters configured to emit a respective plurality of optical signals having different wavelengths, and a multiplexing device configured to multiplex said plurality of optical signals having different wavelengths in said WDM optical signal.

19. The optical transmission system according to claim 18, wherein said first or said second terminal station comprises a transmitter optical amplifier.

20. The optical transmission system according to claim 19, wherein said second supervisory unit is associated to said transmitter optical amplifier, so that said fourth supervisory signal is configured to modulate a gain of said transmitter optical amplifier.

21. The optical transmission system according to claim 20, wherein said transmitter optical amplifier is a co-propagating Raman amplifier.

22. The optical transmission system according to claim 16, wherein said first or said second terminal station comprises at least a third modulator, said second supervisory unit being associated to said third modulator in order to superimpose said fourth supervisory signal to said first or said second optical signal.

23. The optical transmission system according to claim 22, wherein said third modulator is a variable attenuator.

24. The optical transmission system according to claim 23, wherein said third modulator is a magneto-optical variable attenuator.

25. An optical repeater comprising:
- at least a first optical fiber configured to carry a first optical signal in a first direction, at least a first pump source connected to said first optical fiber, said first pump source configured to send on said first optical fiber a pump radiation in said first direction, so as to cause Raman amplification of said first optical signal;
- at least a first photodetector configured for converting a portion of said first optical signal in an electrical signal; and
- a first supervisory unit configured for amplifying said electrical signal, for extracting a first supervisory signal from said electrical signal, and for feeding said extracted amplified first supervisory signal to at least a first
- modulator connected to said first optical fiber or to a driving circuit of said first pump source, so as to superimpose said extracted amplified first supervisory signal on said first optical signal.

26. The optical repeater according to claim 25, wherein said first supervisory unit is associated to said first pump source.

27. The optical repeater according to claim 25, wherein said modulator is a lithium niobate modulator.

28. The optical repeater according to claim 25, wherein said modulator is a semiconductor modulator.

29. The optical repeater according to claim 25, wherein said modulator is a tunable band-pass filter.

30. The optical repeater according to claim 25, wherein said modulator is a variable optical attenuator.

31. An The optical repeater according to claim 30, wherein said variable optical attenuator is a magneto-optical variable attenuator.

32. The optical repeater according to claim 25, further comprising at least a second pump source connected to a second optical fiber configured to carry a second optical signal in a second direction, opposite to said first direction, said second pump source configured to send on said second optical fiber a pump radiation in said second direction, so as to cause Raman amplification of said second optical signal.

33. The optical repeater according to claim 32, further comprising, at least a second photodetector for converting a portion of said second optical signal in into a second electrical signal.

34. The optical repeater according to claim 33, wherein said first supervisory unit is configured for amplifying said second electrical signal, for extracting a second supervisory signal from said second electrical signal, and for feeding said extracted amplified second supervisory signal to at least a second modulator connected to said second optical fiber or to a driving circuit of said second pump source, so as to superimpose said extracted amplified second supervisory signal on said second optical signal.

35. An The optical repeater according to claim 34, wherein said first supervisory unit is configured for generating at least a third supervisory signal, and for feeding said third supervisory signal to a driving circuit of said first or second pump source or to said first or said second modulator, so as to superimpose said third supervisory signal on said first or second optical signal.

36. A method for supervising an optical transmission system comprising an optical link between at least a first and a second terminal station, said method comprising:
- transmitting a first optical signal on said optical link in a first direction;
- sending on said optical link a pump radiation in said first direction, so as to cause Raman amplification of said first optical signal;
- converting, in a point along said optical link, a portion of said first optical signal into an electrical signal
- amplifying said electrical signal;
- extracting a supervisory signal from said electrical signal; and
- superimposing said extracted amplified supervisory signal on said first optical signal.

* * * * *